United States Patent
Horikoshi et al.

(10) Patent No.: US 7,733,297 B2
(45) Date of Patent: Jun. 8, 2010

(54) IMAGE DISPLAY APPARATUS, THREE-DIMENSIONAL IMAGE DISPLAY APPARATUS, AND THREE-DIMENSIONAL IMAGE DISPLAY SYSTEM

(75) Inventors: Tsutomu Horikoshi, Kamakura (JP); Masashi Tsuboi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1227 days.

(21) Appl. No.: 11/287,237

(22) Filed: Nov. 28, 2005

(65) Prior Publication Data
US 2006/0152781 A1 Jul. 13, 2006

(30) Foreign Application Priority Data
Nov. 26, 2004 (JP) ............................. 2004-342965
Nov. 26, 2004 (JP) ............................. 2004-342983

(51) Int. Cl.
- G09G 3/00 (2006.01)
- G09G 3/34 (2006.01)
- G09G 5/00 (2006.01)
- G06F 3/038 (2006.01)
- G03H 1/00 (2006.01)
- G02B 27/22 (2006.01)
- H04N 13/00 (2006.01)

(52) U.S. Cl. .......................... 345/31; 345/204; 345/84; 359/1; 359/462; 348/42

(58) Field of Classification Search ............. 348/42–60; 359/462–477; 345/84
See application file for complete search history.

(56) References Cited

U.S. PATENT DOCUMENTS 3,890,035 A * 6/1975 Takeda ....................... 359/250
5,221,989 A * 6/1993 Stappaerts et al. ........... 359/323
5,757,522 A * 5/1998 Kulick et al. .................. 359/9
5,768,003 A * 6/1998 Gobeli ........................ 359/254
6,269,170 B1 * 7/2001 Horikoshi et al. ........... 382/100
6,927,748 B2 * 8/2005 Hughes et al. ................ 345/32
7,256,783 B2 * 8/2007 Baba et al. .................. 345/427
2005/0083559 A1 * 4/2005 Horikoshi et al. .............. 359/3

FOREIGN PATENT DOCUMENTS

| JP | 2000-214393 | 8/2000 |
| JP | 2000214393 A * | 8/2000 |
| JP | 2002-333870 | 11/2002 |

OTHER PUBLICATIONS

Philip M. Birch, et al., "Two-Pixel computer-generated hologram with a zero-twist nematic liquid-crystal spatial light modulator", Optics Letters, Optical Society of America, XP-000968578, vol. 25, No. 14, Jul. 15, 2000, pp. 1013-1015.

* cited by examiner

*Primary Examiner*—Bipin Shalwala
*Assistant Examiner*—Ilana Spar
(74) *Attorney, Agent, or Firm*—Oblon, Spivak, McClelland, Maier & Neustadt, L.L.P.

(57) ABSTRACT

An image display apparatus includes: a light modulation device having an electro-optic effect in which a refractive index changes according to electric field intensity; a plurality of control points provided on a surface of the light modulation device; and an electric field control section configured to control voltage values to be applied to the plurality of control points, and to form electric field displacement surfaces having a predetermined image pattern in the light modulation device.

21 Claims, 30 Drawing Sheets

FIG. 1
(a)
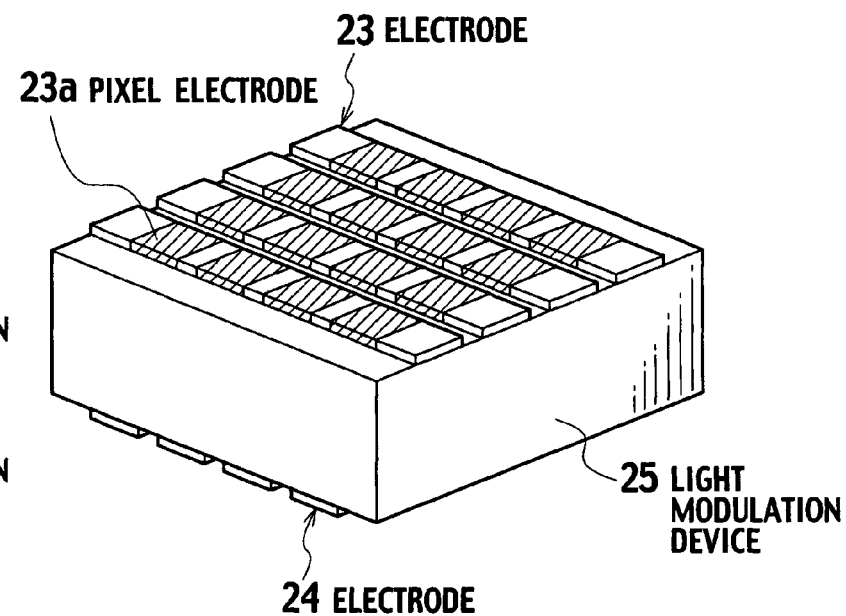
(b)
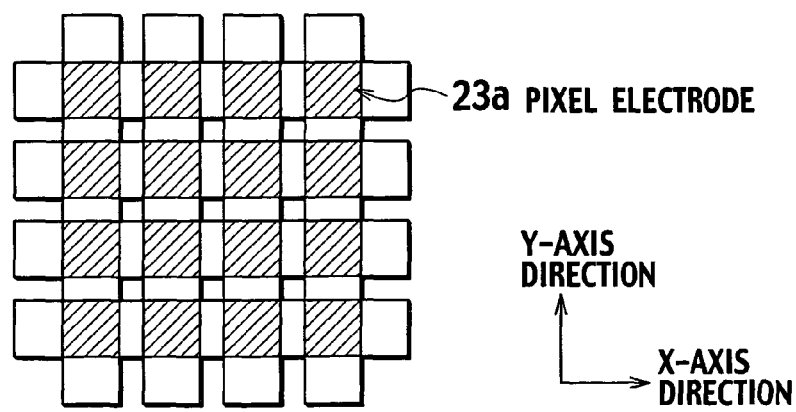

FIG. 5
(a)
(b)
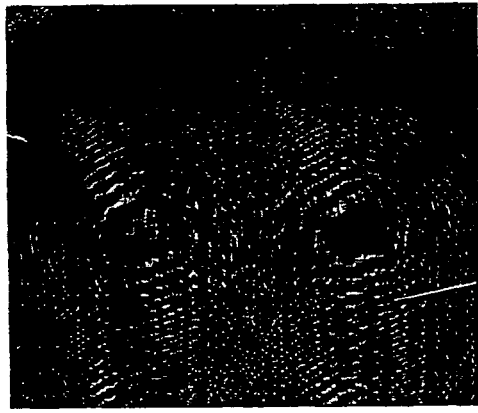
ENLARGED VIEW
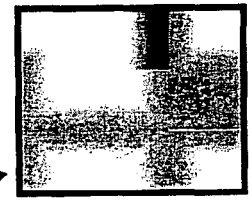

FIG. 7
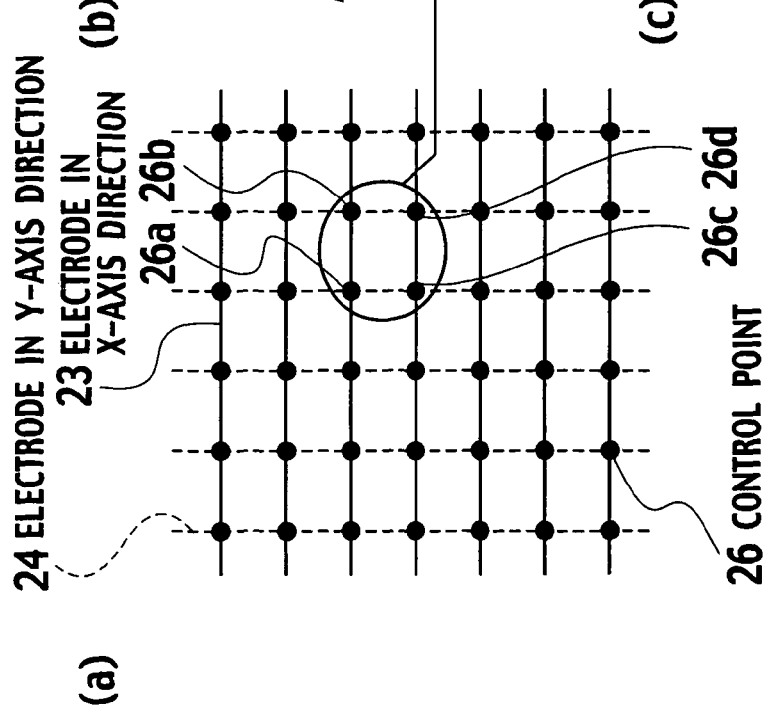
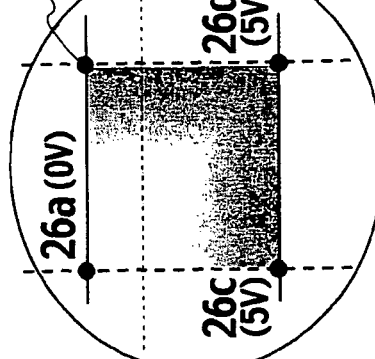

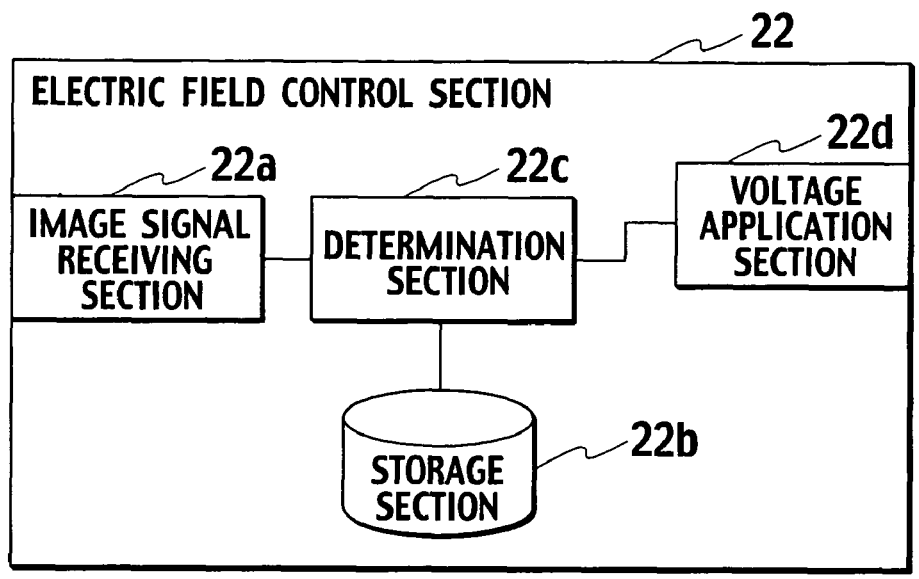

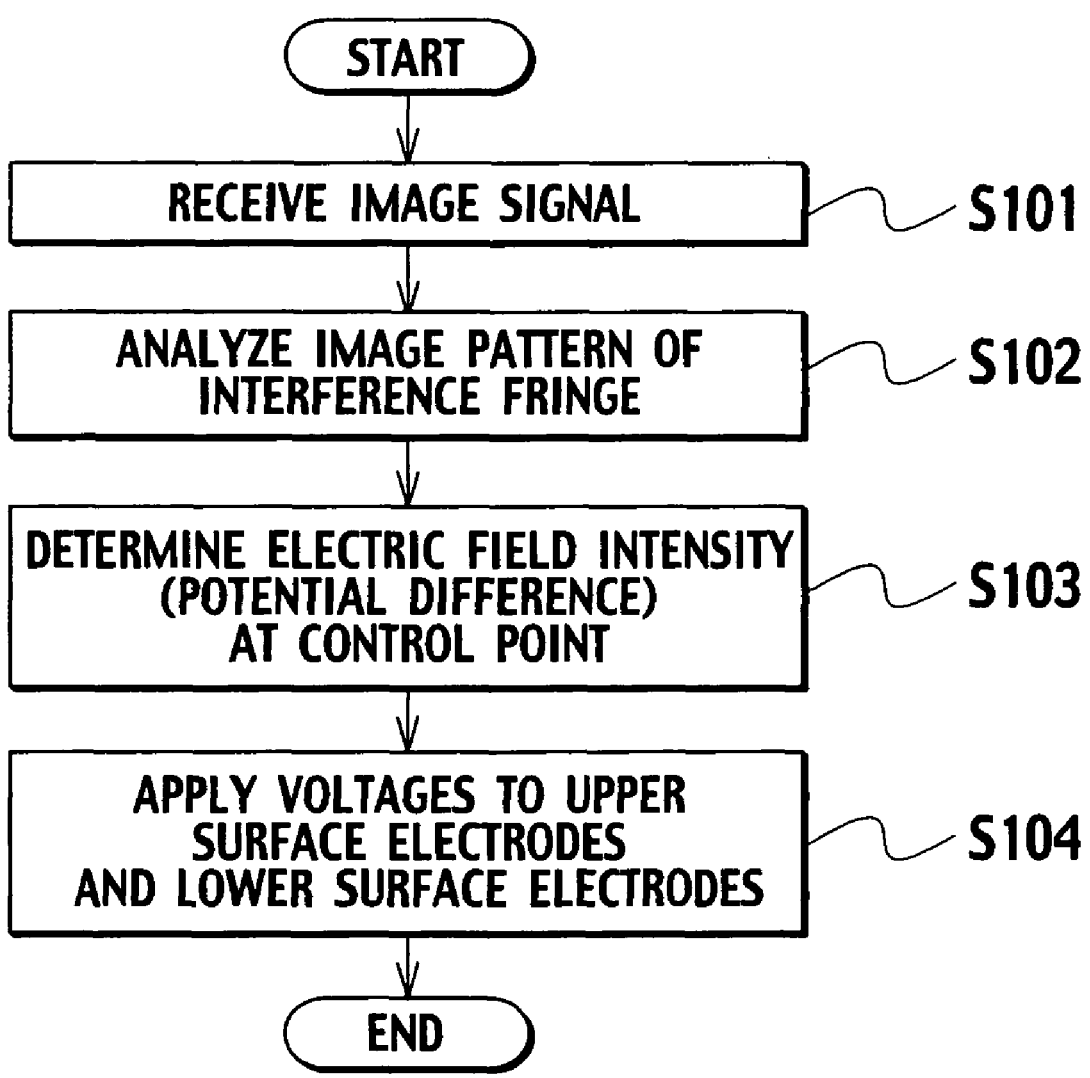

IMAGE DISPLAY APPARATUS, THREE-DIMENSIONAL IMAGE DISPLAY APPARATUS, AND THREE-DIMENSIONAL IMAGE DISPLAY SYSTEM

CROSS REFERENCE TO RELATED APPLICATION

This application is based upon and claims the benefit of priority from the prior Japanese Patent Application No. P2004-342965 and P2004-342983, filed on Nov. 26, 2004; the entire contents of which are incorporated herein by reference.

BACKGROUND OF THE INVENTION

1. Field of the Invention

The present invention relates to an image display apparatus, and also to a three-dimensional image display apparatus and a three-dimensional image display system in which a calculated interference fringe (computer generated hologram) is used to display a three-dimensional image.

2. Description of the Related Art

Conventionally known are image display apparatuses for displaying an image which is formed in a light modulation device by applying a voltage to the light modulation device. Such image display apparatuses include a liquid crystal display (LCD), for example.

Here, the light modulation device is a device having an electro-optic effect. The electro-optic effect is a phenomenon caused by applying an electric field to a substance, and specifically, is a phenomenon in which the refractive index of a substance changes according to the electric field intensity applied to the substance.

Referring to FIGS. 1(a), 1(b), 2(a), and 2(b), an image display apparatus using a conventional light modulation device will be described. Known as the image display apparatus using the conventional light modulation device is an image display apparatus having a simple matrix electrode structure shown in FIGS. 1(a) and 1(b) and an image display apparatus having an active-matrix electrode structure shown in FIGS. 2(a) and 2(b).

As shown in FIG. 1(a), in the image display apparatus having the simple-matrix electrode structure, electrodes 23 are provided in an X-axis direction on the top surface of a thinned light modulation device 25 and electrodes 24 are provided in a Y-axis direction on the bottom surface of the thinned light modulation device 25.

Each of the intersections between the electrodes 23 in the X-axis direction and the electrodes 24 in the Y-axis direction corresponds to a pixel electrode 23a corresponding to each pixel constituting an image to be displayed by the image display apparatus having the simple matrix electrode structure, as shown in FIG. 1(b).

On the other hand, as shown in FIG. 2(a), in the image display apparatus having the active-matrix electrode structure, plural electrodes 23 are provided on the top surface of a light modulation device 25 and an electrode 24 is provided on the bottom surface of the light modulation device 25.

As shown in FIG. 2(b), each of the electrodes 23 has plural pixel electrodes 23a corresponding to each pixel constituting an image to be displayed by the image display apparatus having the active-matrix electrode structure. It is configured that a transistor which can be turned on and off independently is provided for each pixel electrode 23a. The electrode 24 is grounded.

In the conventional image display apparatuses having the simple matrix electrode structure or the active-matrix electrode structure, a voltage value to be applied to each pixel electrode 23 is controlled based on the gray-scale value of each pixel constituting an image to be recorded in the light modulation device 25.

However, in the conventional image display apparatuses having the simple matrix electrode structure or the active-matrix electrode structure, since a voltage value to be applied can be changed only on a pixel-electrode-23a basis, a rectangular region (pixel) shown in FIG. 3 has the same gray-scale value.

Thus, there is a problem in that the precision of images which can be displayed by the conventional image display apparatus is limited by the size and shape of each pixel electrode 23a.

In other words, the conventional image display apparatus has a problem in that since the miniaturization of the pixel electrodes 23a is limited, a quantization error in an image to be displayed becomes large, making it impossible to display the image with high precision.

Further, the conventional image display apparatuses have a problem in that crosstalk caused by voltages to be applied to pixel electrodes 23a is generated between adjacent pixels (rectangular regions).

SUMMARY OF THE INVENTION

In view of the above-mentioned circumstances, the present invention has been made, and has an object to provide an image display apparatus, a three-dimensional image display apparatus, and a three-dimensional image display system all of which can eliminate, as much as possible, a limitation of the image display precision determined by the size and shape of each pixel electrode, and avoid disadvantages caused by crosstalk.

A first aspect of the present invention is summarized as an image display apparatus, including: a light modulation device having an electro-optic effect in which a refractive index changes according to electric field intensity; a plurality of control points provided on a surface of the light modulation device; and an electric field control section configured to control voltage values to be applied to the plurality of control points, and to form electric field displacement surfaces having a predetermined image pattern in the light modulation device.

A second aspect of the present invention is summarized as a three-dimensional image display apparatus which displays a three-dimensional image by using a calculated interference fringe, the apparatus including: a light modulation device having an electro-optic effect in which a refractive index changes according to electric field intensity; a plurality of control points provided on a surface of the light modulation device; and an electric field control section configured to control voltage values to be applied to the plurality of control points, and to form electric field displacement surfaces having an image pattern equivalent to an image pattern of the interference fringe, in the light modulation device.

In the second aspect, the image pattern of the interference fringe can be formed by at least one of phase information of the interference fringe and amplitude information of the interference fringe.

In the second aspect, the control points can be intersections between vertical-direction wiring electrodes which are arranged in a vertical direction and horizontal-direction wiring electrodes which are arranged in a horizontal direction, on the surface of the light modulation device.

In the second aspect, the electric field control section can be configured to store the image pattern of the interference fringe in association with a voltage value to be applied to each of the plurality of control points, and to apply the voltage value associated with the image pattern of the calculated interference fringe to each of the plurality of control points.

In the second aspect, the plurality of control points can be projection portions on electrodes provided on the surface of the light modulation device.

In the second aspect, in the light modulation device, a relationship between the electric field intensity and the change in the refractive index can be nonlinear.

In the second aspect, each of the plurality of control points can include a plurality of microelectrodes; and the electric field control section can be configured to control a voltage value to be applied to each of the plurality of microelectrodes.

A third aspect of the present invention is summarized as a three-dimensional image display system which displays a three-dimensional image, including a server device and a three-dimensional image display apparatus, wherein: the server device includes: an interference fringe computing section configured to calculate an interference fringe generated by an object beam and a reference beam; a storage section configured to store an image pattern of an interference fringe in association with a voltage value to be applied to each of a plurality of control points; and a transmission section configured to transmit a plurality of voltage values associated with the image pattern of the calculated interference fringe to the three-dimensional image display apparatus; and the three-dimensional image display apparatus includes: a light modulation device having an electro-optic effect in which a refractive index changes according to electric field intensity; the plurality of control points provided on a surface of the light modulation device; and an electric field control section configured to apply the plurality of voltage values received from the server device to the plurality of control points, respectively, and to form electric field displacement surfaces having an image pattern equivalent to the image pattern of the interference fringe, in the light modulation device.

A fourth aspect of the present invention is summarized as an image display apparatus, including: a light modulation device having an electro-optic effect in which a refractive index changes according to electric field intensity; a plurality of control points provided on a surface of the light modulation device, a relative positional relationship between each of the plurality of control points and the light modulation device being able to be changed; and an electric field control section configured to synthesize pre-change electric field displacement surfaces formed by voltages applied to the plurality of control points in which the positional relationship has not been changed and post-change electric field displacement surfaces formed by voltages applied to the plurality of control points in which the positional relationship has been changed, and to form electric field displacement surfaces having a predetermined image pattern in the light modulation device.

A fifth aspect of the present invention is summarized as a three-dimensional image display apparatus which displays a three-dimensional image by using a calculated interference fringe, the apparatus including: a light modulation device having an electro-optic effect in which a refractive index changes according to electric field intensity; a plurality of control points provided on a surface of the light modulation device, a relative positional relationship between each of the plurality of control points and the light modulation device being able to be changed; and an electric field control section configured to synthesize pre-change electric field displacement surfaces formed by voltages applied to the plurality of control points in which the positional relationship has not been changed and post-change electric field displacement surfaces formed by voltages applied to the plurality of control points in which the positional relationship has been changed, and to form electric field displacement surfaces having an image pattern equivalent to an image pattern of the interference fringe, in the light modulation device.

In the fifth aspect, the electric field control section can be configured to apply voltages to the plurality of control points in which the positional relationship has not been changed, and while maintaining a state where the refractive index of the light modulation device has been changed, to apply voltages to the plurality of control points in which the positional relationship has been changed.

In the fifth aspect, the image pattern of the interference fringe can be formed by at least one of phase information of the interference fringe and amplitude information of the interference fringe.

In the fifth aspect, the plurality of control points can be intersections between vertical-direction wiring electrodes which are arranged in a vertical direction and horizontal-direction wiring electrodes which are arranged in a horizontal direction, on the surface of the light modulation device.

In the fifth aspect, the electric field control section can be configured to store an image pattern of the interference fringe in association with a voltage value to be applied to each of the plurality of control points, and to apply the voltage value associated with the image pattern of the calculated interference fringe to each of the plurality of control points.

In the fifth aspect, the plurality of control points can be electrodes provided to be freely moved on the surface of the light modulation device.

In the fifth aspect, the light modulation device can be configured to be able to be freely moved with respect to the plurality of control points.

In the fifth aspect, the plurality of control points can be projection portions on electrodes provided on the surface of the light modulation device.

In the fifth aspect, in the light modulation device, a relationship between the electric field intensity and the change in the refractive index can be nonlinear.

In the fifth aspect, each of the plurality of control points can include a plurality of microelectrodes; and the electric field control section can be configured to control a voltage value to be applied to each of the plurality of microelectrodes.

In the fifth aspect, the electric field control section can be configured to control individually application duration for which a voltage is applied to the plurality of control points, before and after the relative positional relationship is changed.

In the fifth aspect, the electric field control section can be configured to control individually, for each of the plurality of control points, application duration for which a voltage is applied to each of the plurality of control points.

A sixth aspect of the present invention is summarized as a three-dimensional image display system which displays a three-dimensional image, including a server device and a three-dimensional image display apparatus, wherein: the server device includes: an interference fringe computing section configured to calculate an interference fringe generated by an object beam and a reference beam; a storage section configured to store an image pattern of an interference fringe, change information on a change in a relative positional relationship between each of a plurality of control points and a light modulation device of the three-dimensional image display apparatus, a pre-change voltage value to be applied to each of the plurality of control points in which the relative positional relationship has not been changed, and a post-change voltage value to be applied to each of the plurality of control points in which the relative positional relationship has been changed, in association with one another; and a transmission section configured to transmit the change information, the pre-change voltage value, and the post-change voltage value which are associated with the image pattern of the calculated interference fringe, to the three-dimensional image display apparatus; and the three-dimensional image display apparatus includes: a light modulation device having an electro-optic effect in which a refractive index changes according to electric field intensity; the plurality of control points provided on a surface of the light modulation device; and an electric field control section configured to apply the pre-change voltage value transmitted from the server device to each of the plurality of control points, to apply the post-change voltage value transmitted from the server device to each of the plurality of control points after changing the relative positional relationship between each of the plurality of control points and the light modulation device based on the change information, and to form electric field displacement surfaces having an image pattern equivalent to the image pattern of the interference fringe, in the light modulation device.

BRIEF DESCRIPTION OF THE DRAWINGS

FIGS. 1(a) and 1(b) are diagrams for explaining a conventional image display apparatus having a simple matrix electrode structure.

FIGS. 5(a) and 5(b) are diagrams showing an example of a computer-generated hologram to be recorded in a light modulation device in the three-dimensional image display system according to the first embodiment of the present invention.

FIGS. 7(a) to 7(d) are diagrams for explaining a control method performed by an electric field control section in the three-dimensional image display system according to the first embodiment of the present invention.

FIG. 8 is a functional block diagram of the electric field control section in the three-dimensional image display system according to the first embodiment of the present invention.

FIG. 9 is a diagram showing contents stored in a storage section of the electric field control section in the three-dimensional image display system according to the first embodiment of the present invention.

FIG. 10 is a flowchart showing an operation of the three-dimensional image display system according to the first embodiment of the present invention.

DETAILED DESCRIPTION OF THE PREFERRED EMBODIMENTS

Figure 2:
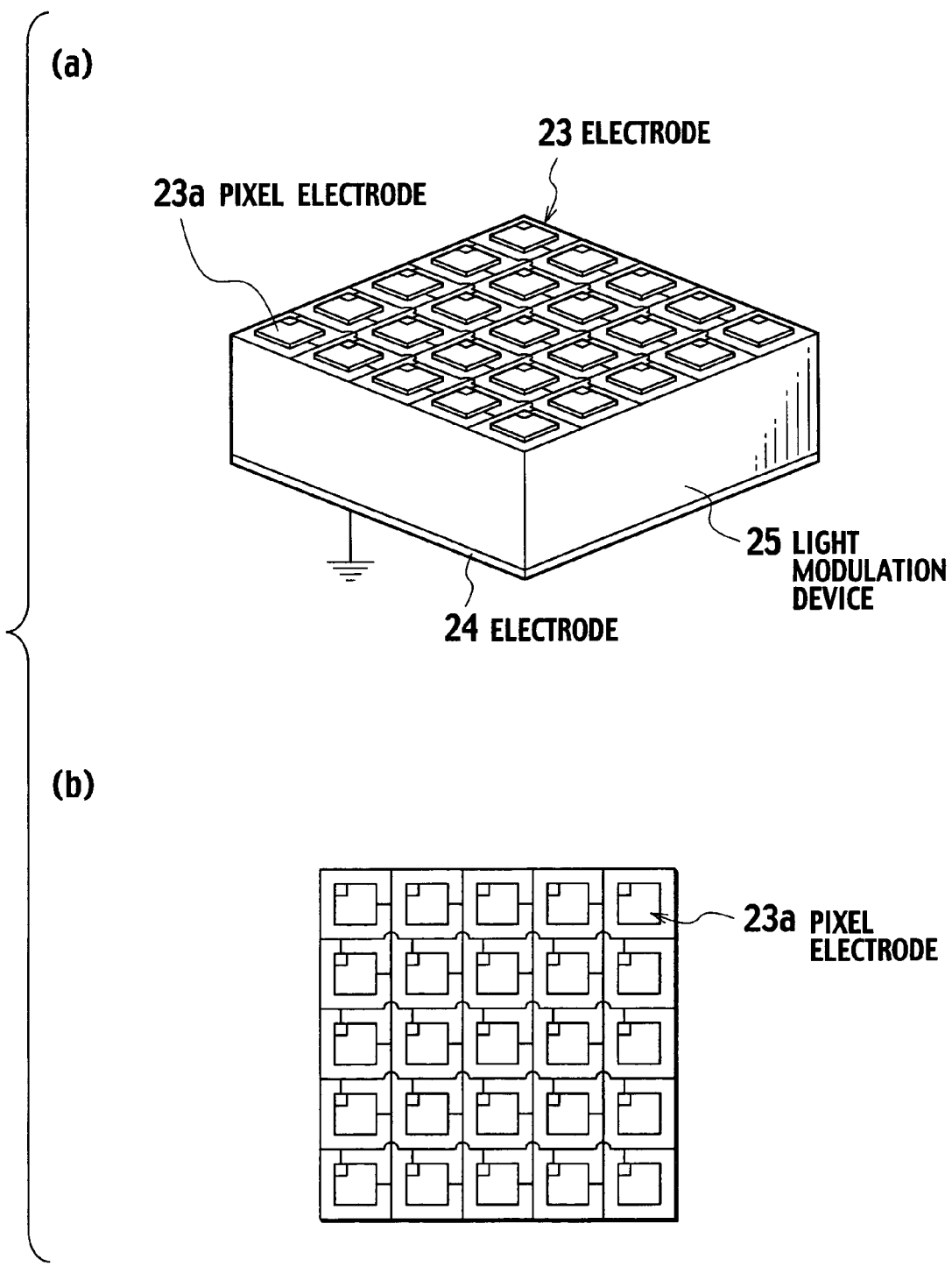
FIGS. 2(a) and 2(b) are diagrams for explaining a conventional image display apparatus having an active-matrix electrode structure.
Figure 3:
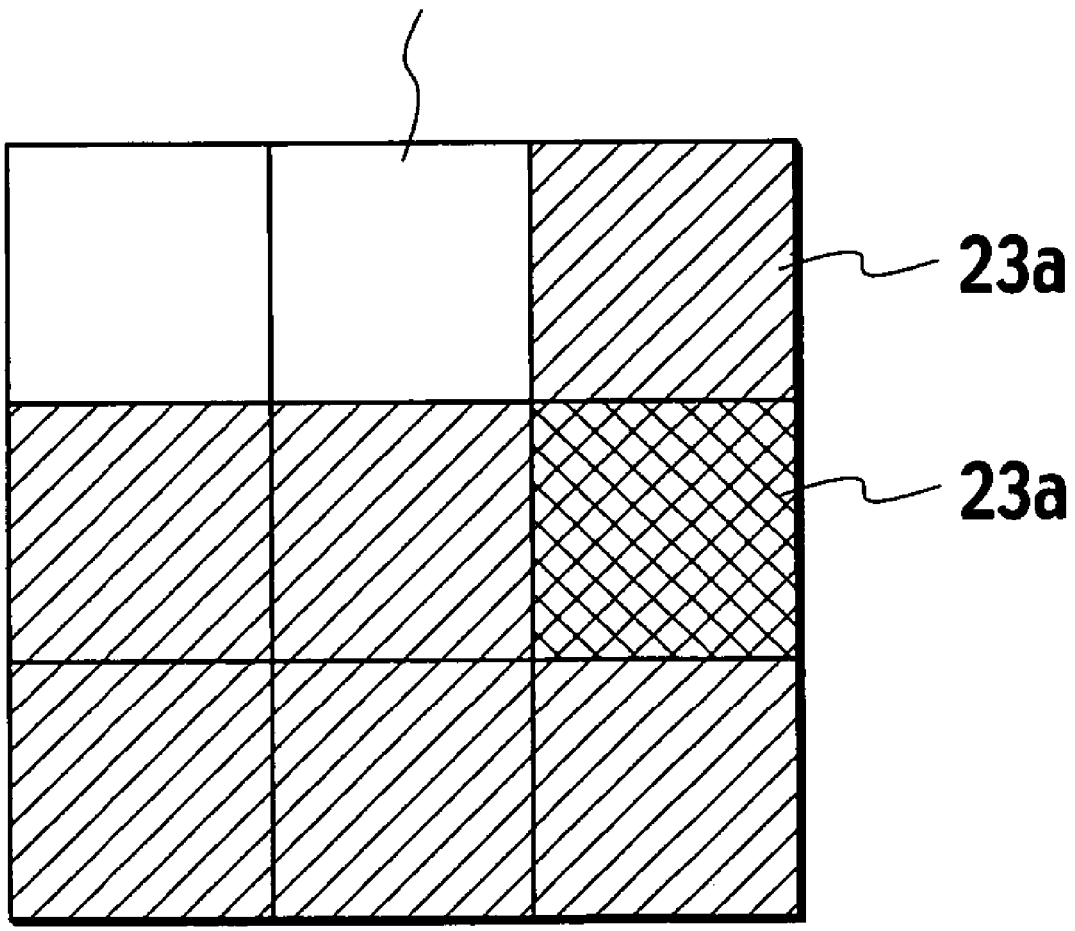
FIG. 3 is a diagram for explaining a problem of the conventional image display apparatus.
Figure 4:
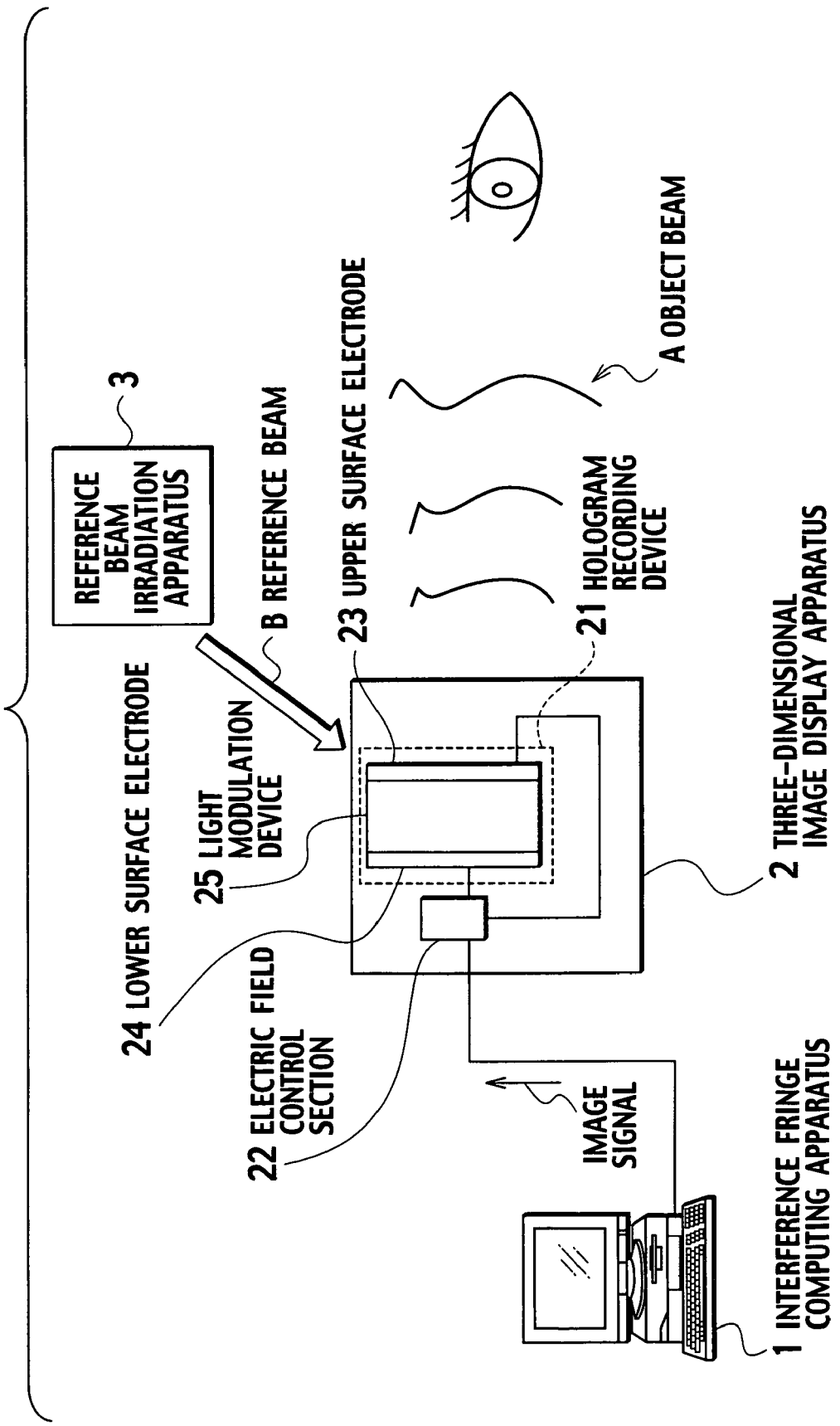
FIG. 4 is a diagram showing the entire configuration of a three-dimensional image display system according to a first embodiment of the present invention.

Configuration of a Three-Dimensional Image Display System According to a First Embodiment of the Present Invention FIG. 4 is a diagram showing the entire configuration of a three-dimensional image display system according to a first embodiment of the present invention.

The three-dimensional image display system according to this embodiment displays a three-dimensional image by using a calculated interference fringe (computer generated hologram) as a display-target image.

In this embodiment, there is an idea that a term "image" includes both a still image and a moving image (picture or video).

As shown in FIG. 4, the three-dimensional image display system according to this embodiment is provided with an interference fringe computing apparatus 1, a three-dimensional image display apparatus 2, and a reference beam irradiation apparatus 3.

The interference fringe computing apparatus 1 is configured by a computer, and is configured to calculate an interference fringe generated by a reference beam and an object beam which is generated when a laser beam irradiated to a three-dimensional shaped object (for example, three dimensional data of a cube) is reflected.

Here, an interference fringe indicates a grayscale image in which a change in luminance corresponds to amplitude information of light and a stripe pattern corresponds to phase information of light, as shown in FIGS. 5(a) and 5(b).

The three-dimensional image display apparatus 2 includes a light modulation device 25 having an electro-optic effect in which the refractive index changes according to the electric field intensity.

The three-dimensional image display apparatus 2 is configured to form, in the light modulation device 25, an image pattern equivalent to the image pattern of an interference fringe which is calculated by the interference fringe computing apparatus 1, by changing the electric field intensity applied to the light modulation device 25 according to the interference fringe.

As shown in FIG. 4, the three-dimensional image display apparatus 2 is provided with a hologram recording device 21 and an electric field control section 22.

Figure 6:
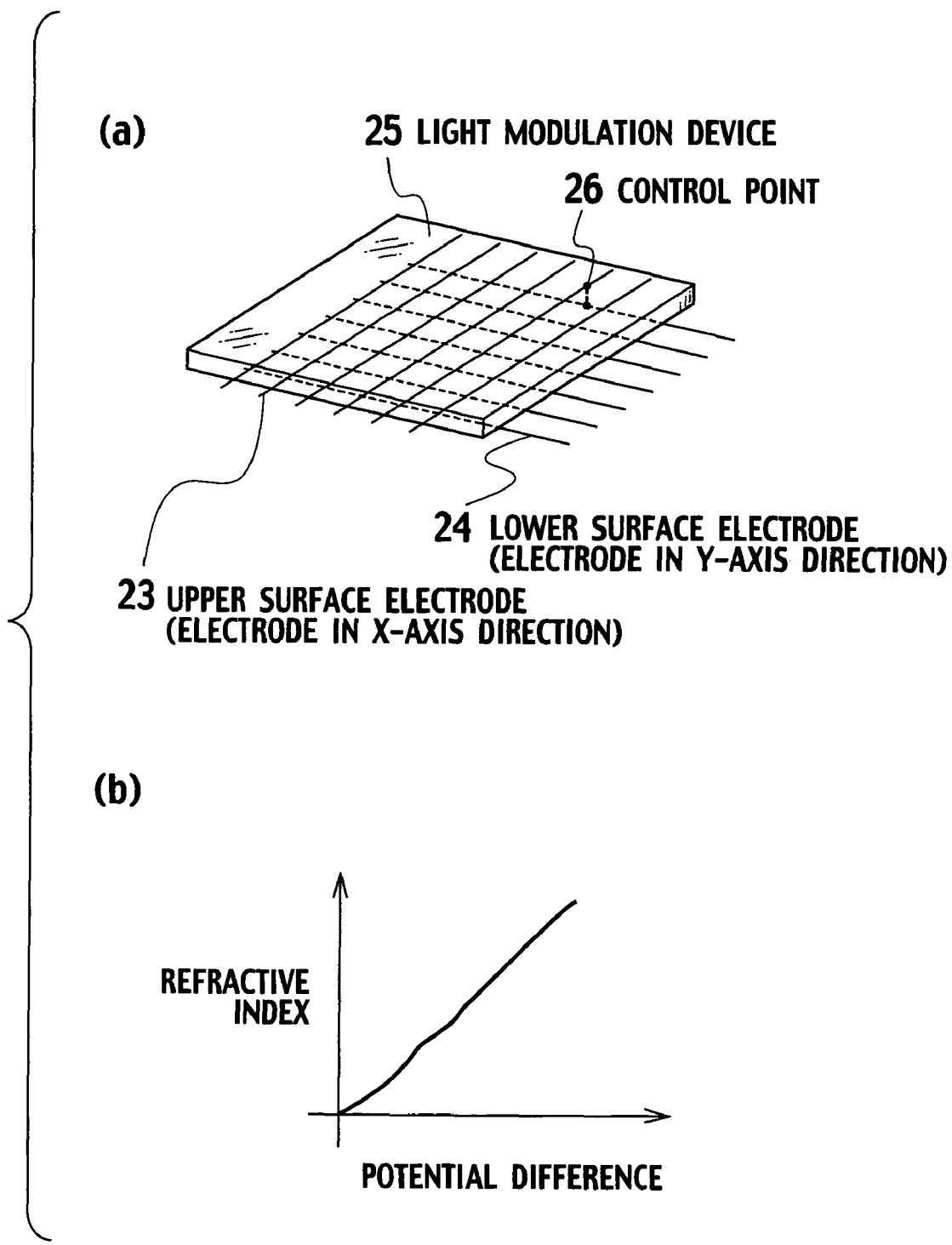
FIGS. 6(a) and 6(b) are diagrams for explaining a three-dimensional image display apparatus in the three-dimensional image display system according to the first embodiment of the present invention.

The hologram recording device 21 includes the light modulation device 25, which has the electro-optic effect in which the refractive index changes according to the electric field intensity, and a plurality of control points 26 provided on a surface of the light modulation device 25, as shown in FIG. 6(a).

Specifically, in the hologram recording device 21, the light modulation device 25 is disposed between fine upper surface electrodes 23 and lower surface electrodes 24.

In this embodiment, intersections between horizontal wiring electrodes arranged in an X-axis direction (horizontal direction) on the top surface of the light modulation device 25 and vertical wiring electrodes arranged in a Y-axis direction (vertical direction) on the bottom surface of the light modulation device 25 are referred to as the "control points 26" where voltage values to be applied are controlled by the electric field control section 22.

Note that the present invention is not limited to an embodiment using the control points 26. The present invention can be applied to another form of the control points 26, determined according to the configuration of the upper surface electrodes 23 and the lower surface electrodes 24.

In this embodiment, the light modulation device 25 is made from a ferroelectric material, such as PLZT, SBT, or SBN, in which refractive index modulation can be easily attained by electric field control with the use of polarization reversal.

Note that FIG. 6(b) shows an example of the relationship between an applied voltage (potential difference) and a refractive index in a specific region of the light modulation device 25 used in this embodiment.

As shown in FIG. 6(b), the light modulation device 25 used in this embodiment has such a characteristic that as an applied voltage increases in a specific region, the refractive index increases in the specific region.

Based on information (the image pattern of an interference fringe) for displaying the interference fringe transmitted with an image signal from the interference fringe computing apparatus 1, the electric field control section 22 is configured to change the refractive index in the light modulation device 25, by changing the electric field intensity (voltage values) to be applied to the control points 26 provided on the surface of the light modulation device 25, and to form the interference fringe in the light modulation device 25.

In this embodiment, the electric field control section 22 is configured to control voltage values to be applied to the plural upper surface electrodes 23 and the plural lower surface electrodes 24 in order to form, in the light modulation device 25, electric field displacement surfaces having an image pattern equivalent to the image pattern of the above interference fringe.

Now, the electric field displacement surfaces (for example, equipotential surfaces having certain value) formed by the electric field control section 22 will be described with reference to FIGS. 7(a) to 7(d).

As shown in FIG. 7(a), the electric field control section 22 changes voltage values to be applied to the upper surface electrodes 23 in the X-axis direction and the lower surface electrodes 24 in the Y-axis direction, thereby controls the voltage values to be applied to the control points 26, which are the intersections therebetween, and forms electric field displacement surfaces to be recorded in the light modulation device 25.

FIG. 7(b) is an enlarged view of an electric field displacement surface formed by control points 26a to 26d.

In an example shown in FIG. 7(b), the potential difference at the control point 26a between the upper surface electrode 23 in the X-axis direction and the lower surface electrode 24 in the Y-axis direction is "0 V", and the potential differences at the control points 26b to 26d between the upper surface electrodes 23 in the X-axis direction and the lower surface electrodes 24 in the Y-axis direction are "5 V".

As a result, the electric field displacement surface shown in FIG. 7(b) is formed in the light modulation device 25 by crosstalk caused by the voltages applied to the control points 26a to 26d.

FIG. 7(c) shows a refractive index distribution on a cross section A-B shown in FIG. 7 (b) in the light modulation device 25, which has formed the electric field displacement surface.

Note that the refractive index is uniform in a state where the electric field intensity is not changed in the light modulation device 25.

The electric field displacement surface, which is formed in the light modulation device 25 by crosstalk caused by the voltages applied to the control points 26a to 26d, corresponds to each of the image pattern of the interference fringe transmitted with the image signal from the interference fringe computing apparatus 1.

As shown in FIG. 7(d), a plurality of electric field displacement surfaces constitute the interference fringe formed in the light modulation device 25.

In this embodiment, the image pattern of the above interference fringe is configured by phase information of the interference fringe, amplitude information of the interference fringe, or a combination of the phase information and the amplitude information of the interference fringe.

Specifically, the electric field control section 22 is provided with an image signal receiving section 22a, a storage section 22b, a determination section 22c, and a voltage application section 22d, as shown in FIG. 8.

The image signal receiving section 22a is configured to receive information (the image pattern of an interference fringe) for displaying the interference fringe transmitted with an image signal from the interference fringe computing apparatus 1 via a wired line or a wireless line.

The storage section 22b is configured to store the image pattern of the interference fringe in association with a voltage value to be applied to each of the plural control points 26.

For example, the storage section 22b is configured to store a table associating identification information of an "image pattern" with potential differences at "control points #1 to #4".

Here, the "image pattern" indicates the image pattern of an electric field displacement surface formed by the potential differences at four control points #1 to #4.

In this embodiment, an electric field displacement surface is formed by potential differences at four control points #1 to #4. However, the present invention is not limited to this, and an electric field displacement surface may be formed by potential differences at control points of an arbitrary number more than one control point.

The determination section 22c is configured to determine a voltage value to be applied to each of the control points 26.

Specifically, the determination section 22c is configured to select, from the table (see FIG. 9) stored in the storage section 22b, an "image pattern" which is the most similar to the image pattern of an interference fringe received by the image signal receiving section 22a, and to determine a voltage value to be applied to each of the control points 26 based on the potential difference at each of the control points 26 associated with the selected "image pattern".

The voltage application section 22d is configured to apply a predetermined voltage to the upper surface electrodes 23 in the X-axis direction and the lower surface electrodes 24 in the Y-axis direction, based on the voltage value to be applied to each of the control points 26, determined by the determination section 22c.

The reference beam irradiation apparatus 3 is configured to irradiate the light modulation device 25 with a reference beam B which has the same wavelength and incident angle as those of the reference beam has, the reference beam used by the interference fringe computing apparatus 1 to calculate the interference fringe.

As described above, when the light modulation device 25 is irradiated with the reference beam B in a state where an interference fringe is recorded in the light modulation device 25, the interference fringe recorded in the light modulation device 25 generates an object beam A.

As a result, the object beam A, which is the same as light coming from the three-dimensional shaped object used by the interference fringe computing apparatus 1 to calculate the interference fringe, is incident on the eyes of a viewer. Therefore, the viewer can view the three-dimensional shaped object in three dimensions.

In the above-described embodiment, the interference fringe computing apparatus 1 and the three-dimensional image display apparatus 2 are separately provided. However, the present invention is not limited to this, but the three-dimensional image display apparatus 2 may include the function of the interference fringe computing apparatus 1.

(Operation of the Three-Dimensional Image Display System According to the First Embodiment of the Present Invention)

An operation of the three-dimensional image display system according to the first embodiment of the present invention will be described with reference to FIG. 10.

In step S101, the electric field control section 22 of the three-dimensional image display apparatus 2 receives an image signal including information (the image pattern of an interference fringe) for displaying the interference fringe calculated by the interference fringe computing apparatus 1.

In step S102, the electric field control section 22 analyzes the image pattern of the interference fringe contained in the received image signal. Specifically, the electric field control section 22 selects, from the table in the storage section 22b, an image pattern which is the most similar to the image pattern of the interference fringe contained in the received image signal.

In step S103, the electric field control section 22 determines a voltage value to be applied to each of the control points 26, based on the electric field intensity (potential difference) of each of the control points 26 associated with the selected image pattern in the table in the storage section 22b.

In step S104, the electric field control section 22 changes a refractive index in the light modulation device 25, by applying voltages to the upper surface electrodes 23 and the lower surface electrodes 24 based on the determined voltage value to be applied to each of the control points 26. As a result, electric field displacement surfaces having an image pattern equivalent to the image pattern of the interference fringe can be formed in the light modulation device 25.

When the reference beam irradiation apparatus 3 irradiates the light modulation device 25 with the reference beam B which has the same wavelength and incident angle as those of the reference beam used by the interference fringe computing apparatus 1 to calculate the interference fringe, in a state where the above image pattern is recorded in the light modulation device 25, the image pattern recorded in the light modulation device 25 generates the object beam A.

As a result, the object beam A, which is the same as light coming from the three-dimensional shaped object used by the interference fringe computing apparatus 1 to calculate the interference fringe, is incident on the eyes of a viewer. Therefore, the viewer can view the three-dimensional shaped object in three dimensions.

(Function and Effect of the Three-Dimensional Image Display System According to the First Embodiment of the Present Invention)

According to the three-dimensional image display system according to the first embodiment of the present invention, electric field displacement surfaces formed by using crosstalk caused by voltages applied to the plural upper surface electrodes 23 and the plural lower surface electrodes 24 (that is, the plural control points 26), in order to express a predetermined image pattern, can display an analog image pattern, and an image with sufficient precision can be displayed without being affected by the image display precision determined by the size and shape of each pixel electrode.

(Configuration of a Three-Dimensional Image Display System According to a Second Embodiment of the Present Invention)

Figure 11:
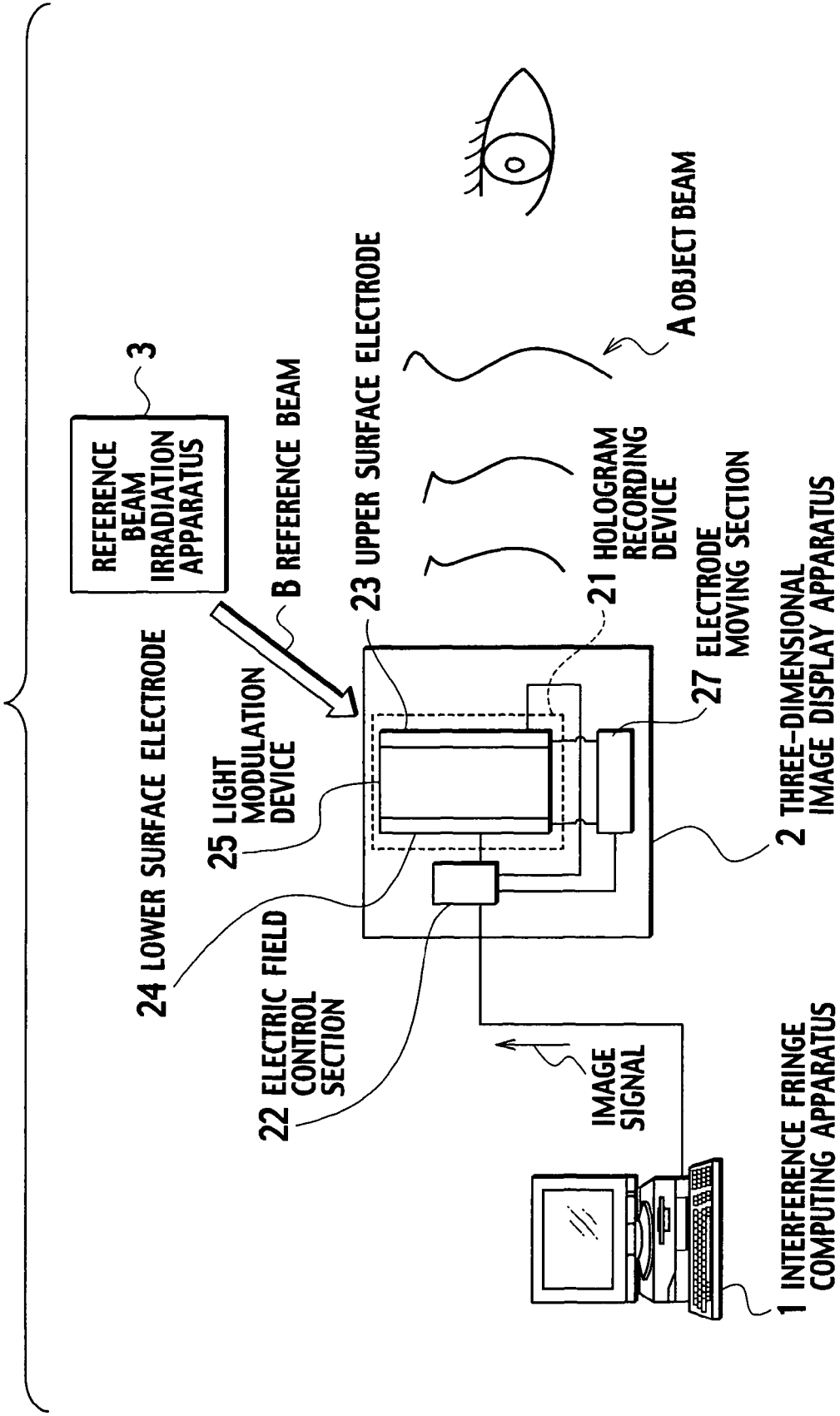
FIG. 11 is a diagram showing the entire configuration of a three-dimensional image display system according to a second embodiment of the present invention.

FIG. 11 is a diagram showing the entire configuration of a three-dimensional image display system according to a second embodiment of the present invention. The three-dimensional image display system according to this embodiment will be described with reference to FIGS. 11 to 16.

Note that as for the configuration of the three-dimensional image display system according to this embodiment, differences from the configuration of the three-dimensional image display system according to the above-described first embodiment will be mainly described.

As shown in FIG. 11, a three-dimensional image display apparatus 2 according to this embodiment is provided with an electrode moving section 27 in addition to the configuration of the three-dimensional image display apparatus 2 according to the above-described first embodiment.

Each of the plural control points 26 is configured in a manner that the relative positional relationship between a light modulation device 25 and each of plural control points 26 can be changed.

In this embodiment, the control points 26 provided on a surface of the light modulation device 25 is configured to be able to be moved by the electrode moving section 27.

Figure 12:
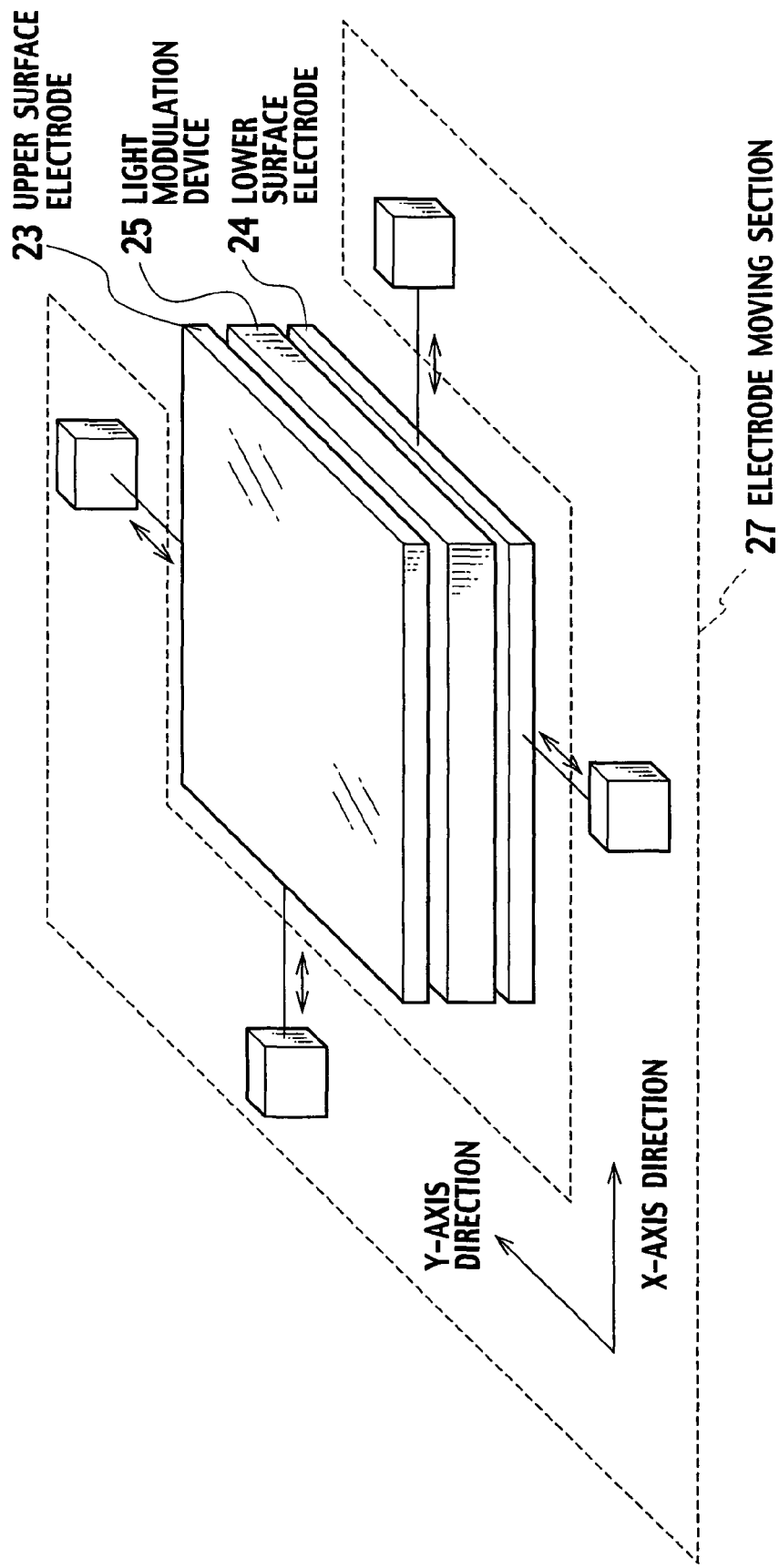
FIG. 12 is a diagram for explaining a three-dimensional image display apparatus in the three-dimensional image display system according to the second embodiment of the present invention.

Specifically, as shown in FIG. 12, upper surface electrodes 23 and lower surface electrodes 24 is configured to be able to be freely moved in an X-axis direction and a Y-axis direction by the electrode moving section 27 which is configured by a piezoelectric element, a damper, or the like.

Based on information (the image pattern of an interference fringe) for displaying the interference fringe transmitted with an image signal from an interference fringe computing apparatus 1, an electric field control section 22 is configured to change the refractive index in the light modulation device 25, by changing the electric field intensity (voltage value) to be applied to the control points 26 provided on the surface of the light modulation device 25, and to form the interference fringe in the light modulation device 25.

In other words, the electric field control section 22 is configured to control voltage values to be applied to the plural upper surface electrodes 23 and the plural lower surface electrodes 24 and to form, in the light modulation device 25, electric field displacement surfaces having an image pattern equivalent to the image pattern of the above interference fringe.

In this embodiment, the image pattern of the above interference fringe is configured by phase information of the interference fringe, amplitude information of the interference fringe, or a combination of the phase information and the amplitude information of the interference fringe.

Specifically, the electric field control section 22 is configured to synthesize pre-change electric field displacement surfaces formed by voltages applied to the control points 26 before the relative positional relationship between the light modulation device 25 and each of the control points 26 is changed, and post-change electric field displacement surfaces formed by voltages applied to the control points 26 after the relative positional relationship between the light modulation device 25 and each of the control points 26 is changed, and to form, in the light modulation device 25, electric field displacement surfaces having an image pattern equivalent to the image pattern of the interference fringe.

In this embodiment, the electric field control section 22 is configured to synthesize pre-movement electric field displacement surfaces (pre-change electric field displacement surfaces) formed by voltages applied to the plural control points 26 which have not been moved, and post-movement electric field displacement surfaces (post-change electric field displacement surfaces) formed by voltages applied to the plural control points 26 which have been moved, and to form, in the light modulation device 25, electric field displacement surfaces having an image pattern equivalent to the image pattern of the interference fringe.

In other words, the electric field control section 22 according to this embodiment utilizes a nature of the light modulation device 25 which can hold, for certain duration, a refractive index changed by an applied voltage value (electric field intensity) and thereby to form, in the light modulation device 25, electric field displacement surfaces having an image pattern equivalent to the image pattern of the interference fringe.

In this embodiment, the electric field control section 22 is configured to move the control points 26 (in other words, the upper surface electrodes 23 or the lower surface electrodes 24) once or twice, to synthesize two or three electric field displacement surfaces, and to form, in the light modulation device 25, electric field displacement surfaces having an image pattern equivalent to the image pattern of the interference fringe.

However, the present invention is not limited to this. The electric field control section 22 may move the control points 26 (in other words, the upper surface electrodes 23 or the lower surface electrodes 24) any number of times, synthesize any number of electric field displacement surfaces, and form, in the light modulation device 25, electric field displacement surfaces having an image pattern equivalent to the image pattern of the interference fringe.

Figure 13:
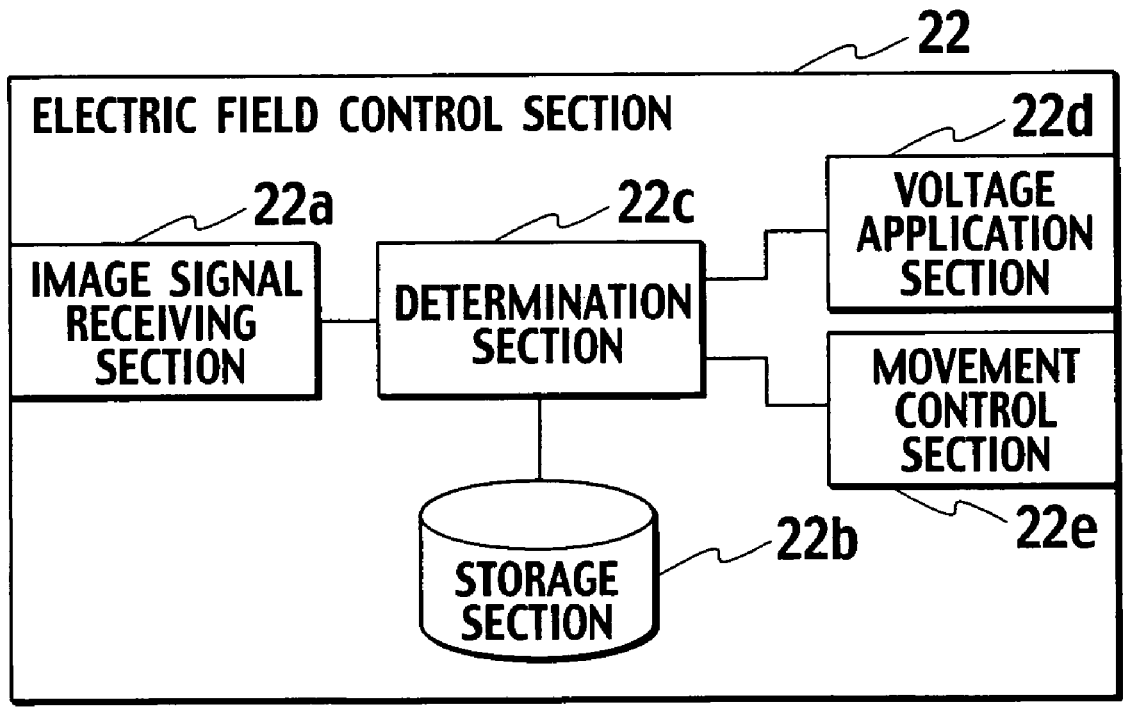
FIG. 13 is a functional block diagram of an electric field control section in the three-dimensional image display system according to the second embodiment of the present invention.

Specifically, as shown in FIG. 13, the electric field control section 22 according to this embodiment is provided with an image signal receiving section 22a, a storage section 22b, a determination section 22c, a voltage application section 22d, and a movement control section 22e.

The image signal receiving section 22a is configured to receive information (the image pattern of an interference fringe) for displaying the interference fringe transmitted with an image signal from the interference fringe computing apparatus 1 via a wired line or a wireless line.

The storage section 22b is configured to store the image pattern of an interference fringe, change information on a change in the relative positional relationship between each of the plural control points 26 and the light modulation device 25, a pre-change voltage value to be applied to each of the control points 26 before the positional relationship is changed, and a post-change voltage value to be applied to each of the control points 26 after the positional relationship is changed, in association with one another.

In this embodiment, the storage section 22b is configured to store the image pattern of an interference fringe, movement information (change information) on the movement of the plural control points 26, a pre-movement voltage value (pre-change voltage value) to be applied to each of the control points 26 before its movement, and a post-movement voltage value (post-change voltage value) to be applied to each of the control points 26 after its movement, in association with one another.

Figure 14:
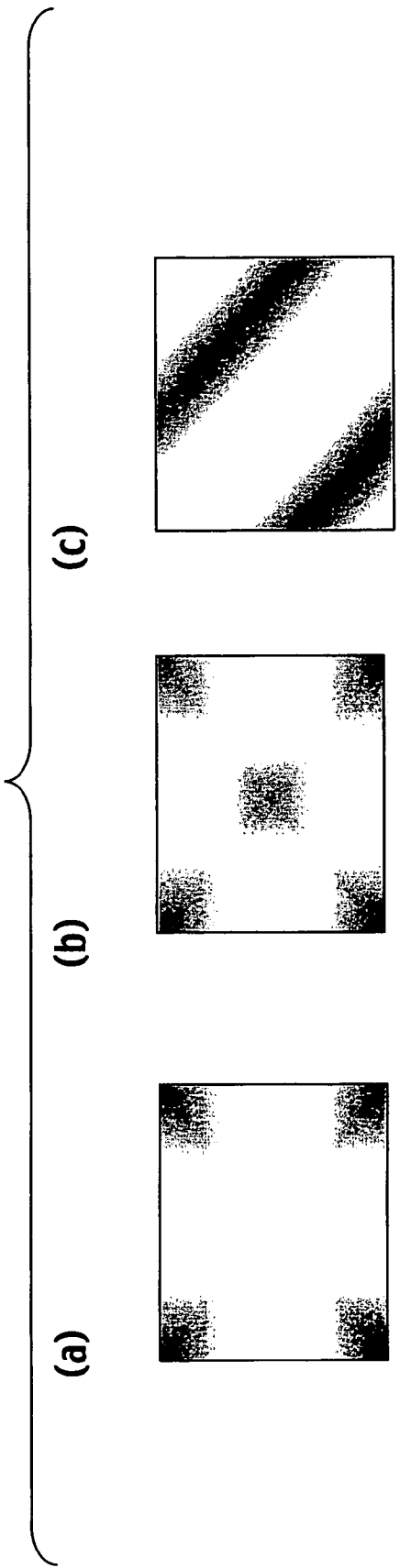
FIGS. 14(a) to 14(d) are diagrams for explaining a control method performed by the electric field control section in the three-dimensional image display system according to the second embodiment of the present invention.

For example, the storage section 22b stores three kinds of image patterns of interference fringes shown in FIGS. 14(*a*) to 14(*c*). Hereinafter, the image pattern shown in FIG. 14(*a*) is referred to as an "image pattern (a)", the image pattern shown in FIG. 14(*b*) is referred to as an "image pattern (b)", and the image pattern shown in FIG. 14(*c*) is referred to as an "image pattern (c)".

In this case, for example, the storage section 22b stores a table associating "image pattern", "movement information", "pre-movement voltage value", "post-movement voltage value", and "application duration" with one another, as shown in FIG. 14(*d*).

An "image pattern" indicates the image pattern of an electric field displacement surface formed by potential differences at four control points #1 to #4.

In this embodiment, the potential difference values are prepared in the table in advance. However, the potential difference values may be calculated on an as-needed basis by using the predefined function, or may be set as arbitrary values.

In this embodiment, an electric field displacement surface is formed by potential differences at four control points #1 to #4.

However, the present invention is not limited to this. An electric field displacement surface may be formed by potential differences at control points of an arbitrary number more than one control point.

In a "movement information" field, a direction in which the control points 26 (in other words, the upper surface electrodes 23 or the lower surface electrodes 24) are moved is indicated by a vector (distance in the X-axis direction, distance in the Y-axis direction).

In this embodiment, the case where the distances are set in the predetermined unit is explained. However, it is possible to set the distances as arbitrary values, or change the distances arbitrarily in accordance with characteristics of image patterns to be displayed.

In a "pre-movement voltage value", there are indicated voltage values applied to four control points 26a to 26d surrounding an area corresponding to the image pattern before the four control points 26a to 26d (in other words, the upper surface electrodes 23 or the lower surface electrodes 24) are moved.

The voltage values are expressed as follows: (a voltage value to be applied to the control point 26a, a voltage value to be applied to the control point 26b, a voltage value to be applied to the control point 26c, a voltage value to be applied to the control point 26d).

In a "post-movement voltage value", there are indicated voltage values applied to the four control points 26a to 26d surrounding the area corresponding to the image pattern after the four control points 26a to 26d (in other words, the upper surface electrodes 23 or the lower surface electrodes 24) are moved.

The voltage values are expressed as follows: (a voltage value to be applied to the control point 26a, a voltage value to be applied to the control point 26b, a voltage value to be applied to the control point 26c, a voltage value to be applied to the control point 26d).

In an "application duration", the duration for which voltages are applied to the control points 26 is indicated. In the table shown in FIG. 14(D), the unit of the application duration is "ms", for example.

To be specific, in the table shown in FIG. 14(*d*), a "pre-movement voltage value" of "20 V" is applied to each of the four control points 26a to 26d for "10 ms" to form the image pattern (a), without moving the control points 26a to 26d (in other words, the upper surface electrodes 23 or the lower surface electrodes 24).

Figure 15:
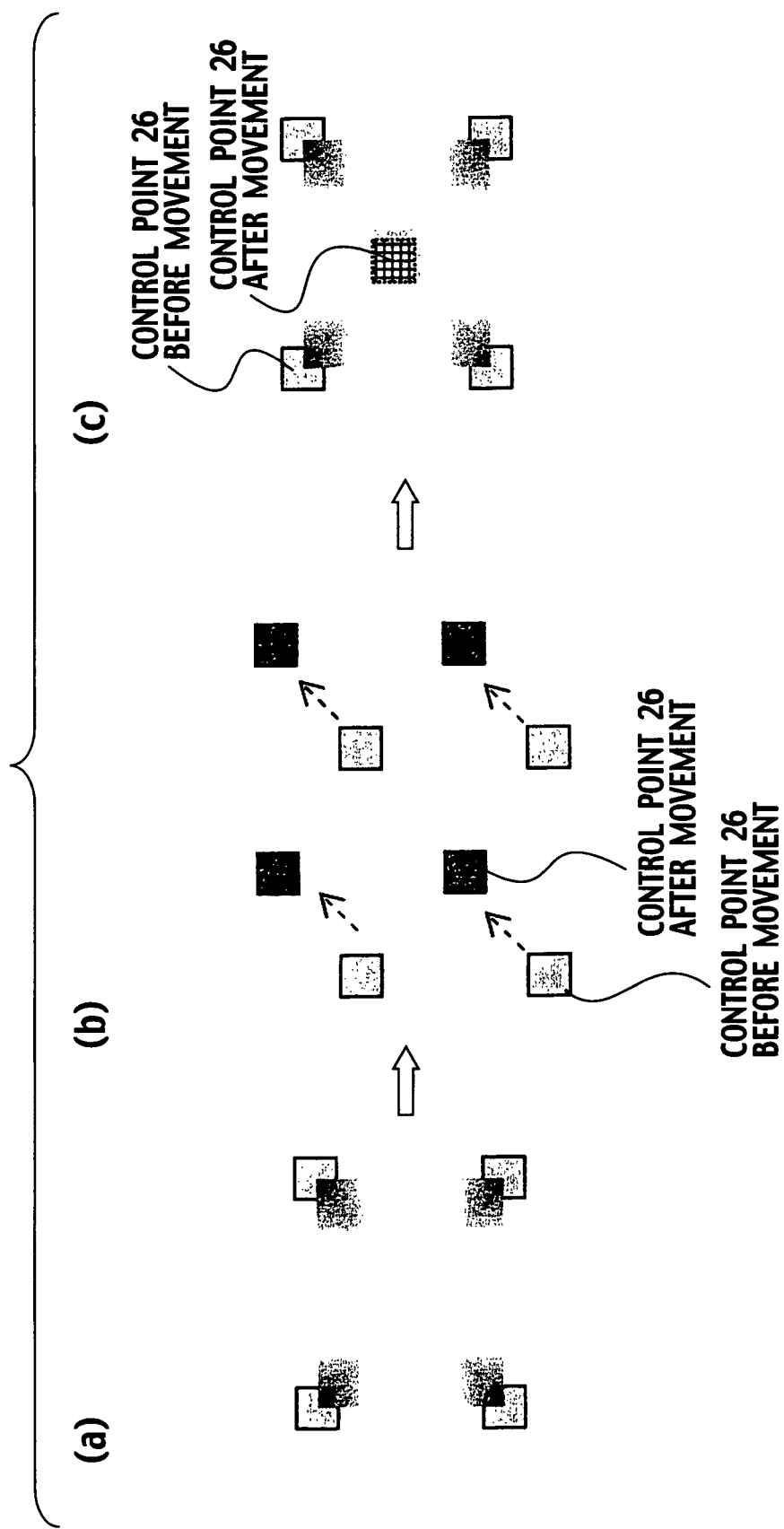
FIGS. 15(a) to 15(c) are diagrams for explaining a control method performed by the electric field control section in the three-dimensional image display system according to the second embodiment of the present invention.

Further, in the table shown in FIG. 14(*d*), a "pre-movement voltage value" of "20 V" is applied to each of the four control points 26a to 26d for "100 ms", thereafter the four control points 26a to 26d (in other words, the upper surface electrodes 23 or the lower surface electrodes 24) are moved by "1 (unit distance)" in the X-axis direction and "1 (unit distance)" in the Y-axis direction, and a "post-movement voltage value" of "20 V" is applied to each of the four control points 26a to 26d for "100 ms" to thereby form the image pattern (b), as shown in FIGS. 15(*a*) to 15(*c*).

Figure 16:
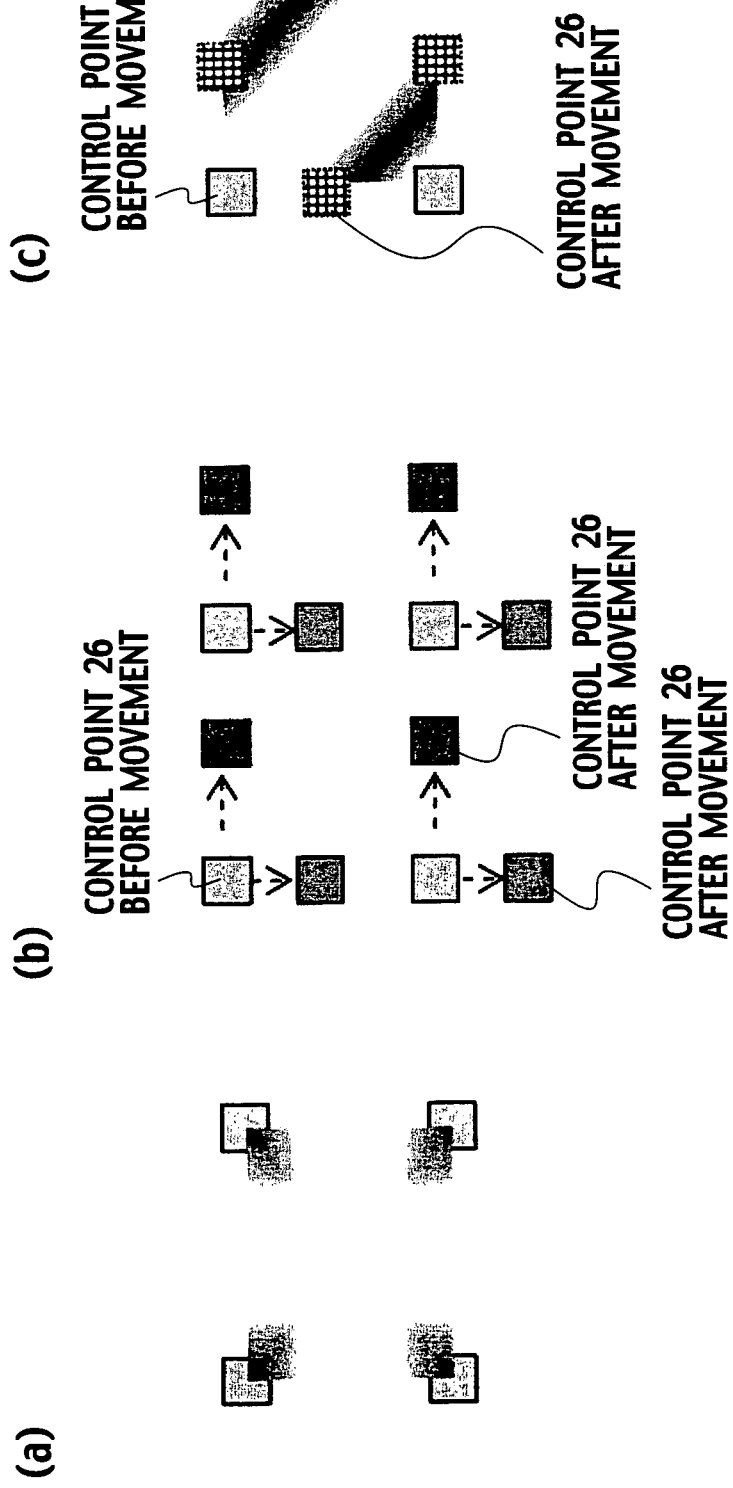
FIGS. 16(a) to 16(c) are diagrams for explaining a control method performed by the electric field control section in the three-dimensional image display system according to the second embodiment of the present invention.

Further, in the table shown in FIG. 14(*d*), the image pattern is generated in the following manner that the four control points 26a to 26d (in other words, the upper surface electrodes 23 or the lower surface electrodes 24) are moved by "1 (unit distance)" in the Y-axis direction from a state where no voltage is applied to each of the four control points 26a to 26d (a state where the "pre-movement voltage value" is "0 V"), a "post-movement voltage value" of "20 V" is applied to each of the four control points 26a to 26d for "20 ms", the upper surface electrodes 23 or the lower surface electrodes 24 (in other words, the four control points 26a to 26d) are moved by "1 (unit distance)" in the X-axis direction, and a "post-movement voltage value" of "20 V" is applied to each of the four control points 26a to 26d for "50 ms" to thereby form the image pattern (c), as shown in FIGS. 16(*a*) to 16(*c*).

Note that the table shown in FIG. 14(*d*) is one example. The storage section 22b may be configured to store a table including records having any format each of which associates movement information of the control points 26, a pre-movement voltage value and a post-movement voltage value, and an image pattern with one another.

The determination section 22c is configured to determine the movement information of the control points 26 (in other words, the upper surface electrodes 23 or the lower surface electrodes 24) and the pre-movement voltage value and the post-movement voltage value to be applied to each of the control points 26.

Specifically, the determination section 22c is configured to select, from the table (see FIG. 14(*d*)) stored in the storage section 22b, an "image pattern" which is the most similar to the image pattern of an interference fringe received by the image signal receiving section 22a, and to determine the movement information of the control points 26 and the pre-movement voltage value and the post-movement voltage value to be applied to each of the control points 26 based on the movement information of the control points 26, the pre-movement voltage value, and the post-movement voltage value which are associated with the selected "image pattern".

Further, the determination section 22c may be configured to control the application duration, for which a voltage is applied to each of the control points 26, before and after the movement individually (before and after the change of the relative positional relationship between the light modulation device 25 and each of the control points 26), based on the table shown in FIG. 14(*d*).

Further, the determination section 22c may be configured to control individually, for each of the control points 26, the application duration, for which a voltage is applied to each of the control points 26.

The voltage application section 22d is configured to apply predetermined voltages to the upper surface electrodes 23 and the lower surface electrodes 24 which have not been moved, based on the pre-movement voltage value to be applied to each of the control points 26 determined by the determination section 22c; and to apply predetermined voltages to the upper surface electrodes 23 and the lower surface electrodes 24 which have been moved, based on the post-movement voltage value to be applied to each of the control points 26 determined by the determination section 22c.

Specifically, the voltage application section 22d may be configured to apply a voltage (a voltage of a pre-movement voltage value) to each of the control points 26 which has not been moved (before the relative positional relationship between the light modulation device 25 and each of the control points 26 is changed), and while maintaining a state where the refractive index of the light modulation device 25 has been changed, to apply a voltage (a voltage of a post-movement voltage value) to a plurality of the control points 26 which have been moved (after the relative positional relationship between the light modulation device 25 and each of the control points 26 is changed).

The movement control section 22e is configured to instruct the electrode moving section 27 to move the upper surface electrodes 23, the lower surface electrodes 24, or both the electrodes 23 and 24, based on the movement information of the control points 26 determined by the determination section 22c.

In this embodiment described above, the interference fringe computing apparatus 1 and the three-dimensional image display apparatus 2 are separately provided. However, the present invention is not limited to this, but the three-dimensional image display apparatus 2 may include the function of the interference fringe computing apparatus 1.

(Operation of the Three-Dimensional Image Display System According to the Second Embodiment of the Present Invention)

Figure 17:
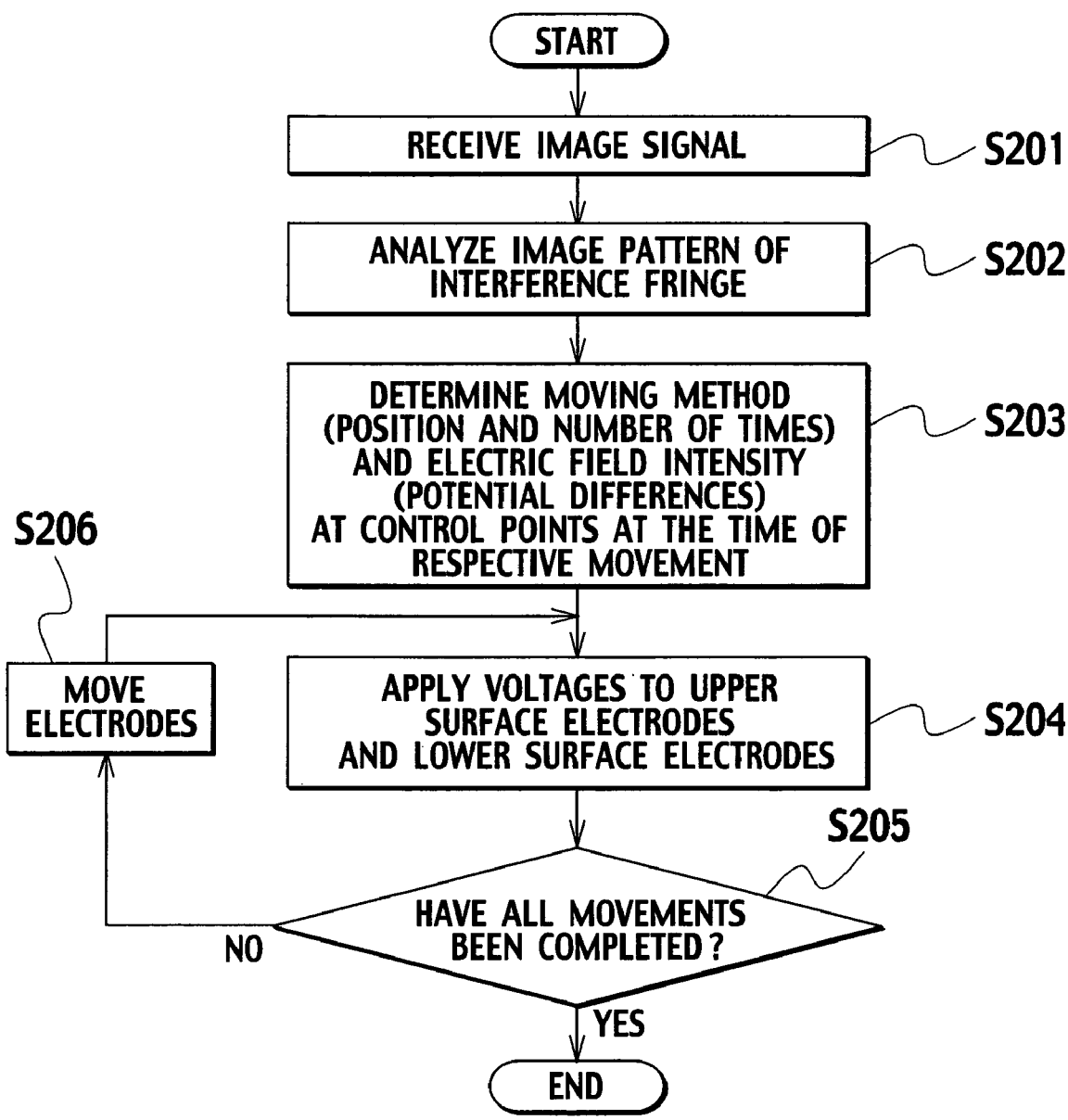
FIG. 17 is a flowchart showing an operation of the three-dimensional image display system according to the second embodiment of the present invention.

An operation of the three-dimensional image display system according to the second embodiment of the present invention will be described with reference to FIG. 17.

In step S201, the electric field control section 22 of the three-dimensional image display apparatus 2 receives an image signal including information (the image pattern of an interference fringe) for displaying the interference fringe calculated by the interference fringe computing apparatus 1.

In step S202, the electric field control section 22 analyzes the image pattern of the interference fringe contained in the received image signal. Specifically, the electric field control section 22 selects, from the table in the storage section 22b, an image pattern which is the most similar to the image pattern of the interference fringe contained in the received image signal.

In step S203, the electric field control section 22 extracts the movement information of the control points 26, the pre-movement voltage value (electric field intensity or potential difference) and the post-movement voltage value (electric field intensity or potential difference) to be applied to each of the control points 26, and the application duration for the pre-movement voltage value and the post-movement voltage value, all of which are associated with the selected image pattern in the table stored in the storage section 22b.

As a result, the electric field control section 22 determines, based on the extracted information, a moving method of the upper surface electrodes 23, of the lower surface electrodes 24, or of both the electrodes 23 and 24 (for example, where to move the control points 26, and how many times to move the control points 26).

Further, the electric field control section 22 determines, based on the extracted information, the pre-movement voltage value and the post-movement voltage value to be applied to each of the control points 26, and the application duration for the respective voltage values.

In step S204, the electric field control section 22 applies, based on the determined pre-movement voltage value (or post-movement voltage value) to be applied to each of the control points 26, predetermined voltages to the upper surface electrodes 23 and the lower surface electrodes 24 for predetermined duration to change the refractive index in the light modulation device 25.

As a result, pre-movement electric field displacement surfaces or post-movement electric field displacement surfaces are formed in the light modulation device 25.

In step S205, the electric field control section 22 determines whether all the movements determined in step S203 have been completed or not. When it is determined that all the movements have not been completed, this operation proceeds to step S206. When it is determined that all the movements have been completed, this operation ends.

In step S206, the electric field control section 22 moves the upper surface electrodes 23, the lower surface electrodes 24, or both the electrodes 23 and 24, based on the moving method determined in step S203.

By repeating operations in Steps S203 and S204, the pre-movement electric field displacement surfaces formed by the voltages applied to the plural control points 26 which have not been moved and the post-movement electric field displacement surfaces formed by the voltages applied to the plural control points 26 which have been moved are synthesized, and as a result, electric field displacement surfaces having an image pattern equivalent to the image pattern of the interference fringe are formed in the light modulation device 25.

(Function and Effect of the Three-Dimensional Image Display System According to the Second Embodiment of the Present Invention)

According to the three-dimensional image display system according to the second embodiment of the present invention, the electric field displacement surfaces having an image pattern equivalent to the image pattern of the interference fringe are formed in the light modulation device 25 by utilizing a nature of the light modulation device 25, which can hold, for certain duration, a refractive index changed by an applied voltage value (electric field intensity).

Therefore, an analog image pattern can be displayed, and an image with sufficient precision can be displayed without being affected by the image display precision determined by the size and shape of each pixel electrode.

(A Three-Dimensional Image Display System According to a Third Embodiment of the Present Invention)

A three-dimensional image display system according to a third embodiment of the present invention will be described with reference to FIGS. 18 and 19.

Figure 18:
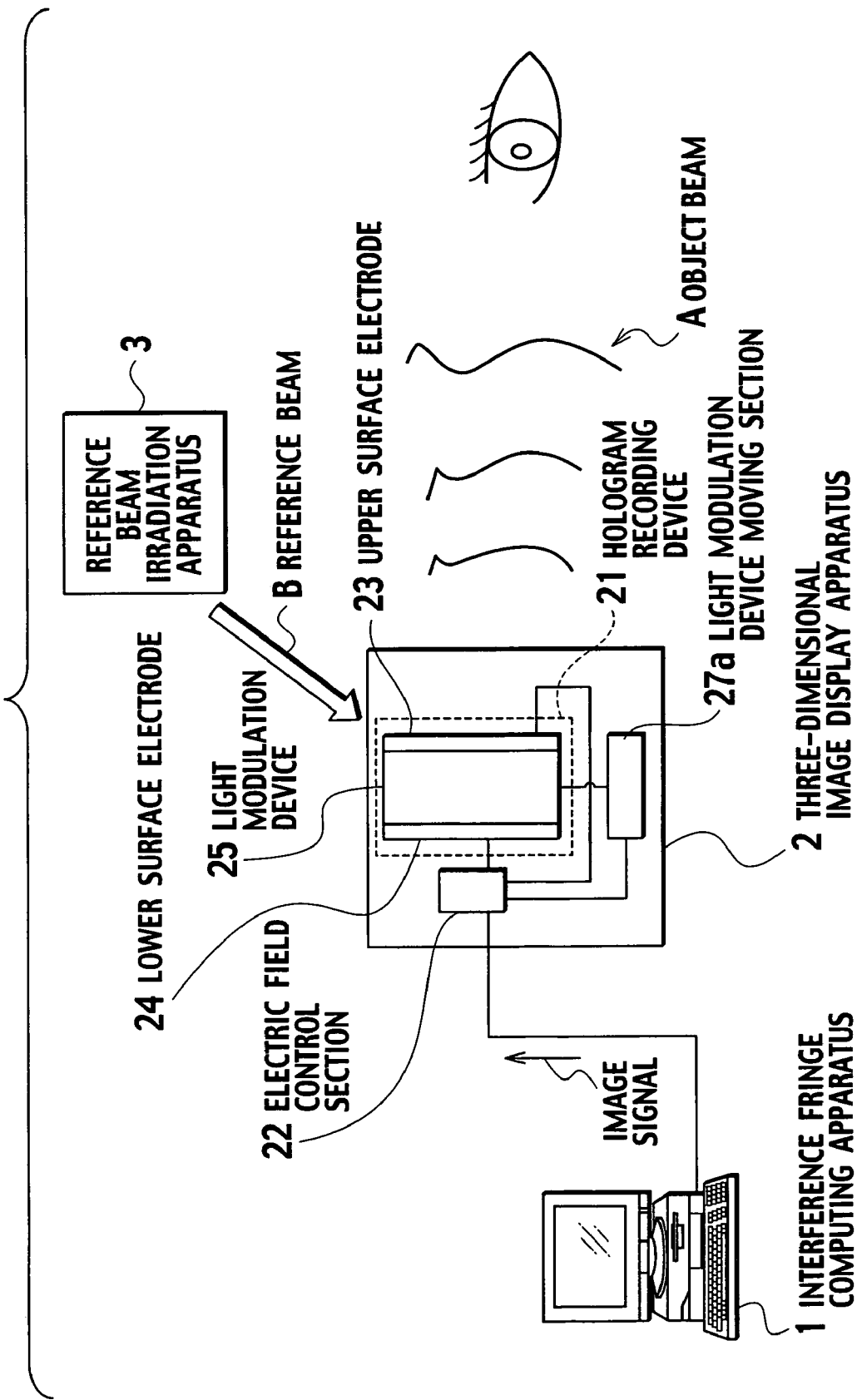
FIG. 18 is a diagram showing the entire configuration of a three-dimensional image display system according to a third embodiment of the present invention.

As shown in FIG. 18, the three-dimensional image display system according to this embodiment is provided with a light modulation device moving section 27a in place of the electrode moving section 27 described in the second embodiment.

The other configurations are the same as those of the three-dimensional image display system of the above-described second embodiment.

In this embodiment, the relative positional relationship between a light modulation device 25 and each of plural control points 26 is configured to be able to be changed. The light modulation device 25 is configured to be able to be moved by the light modulation device moving section 27a.

Figure 19:
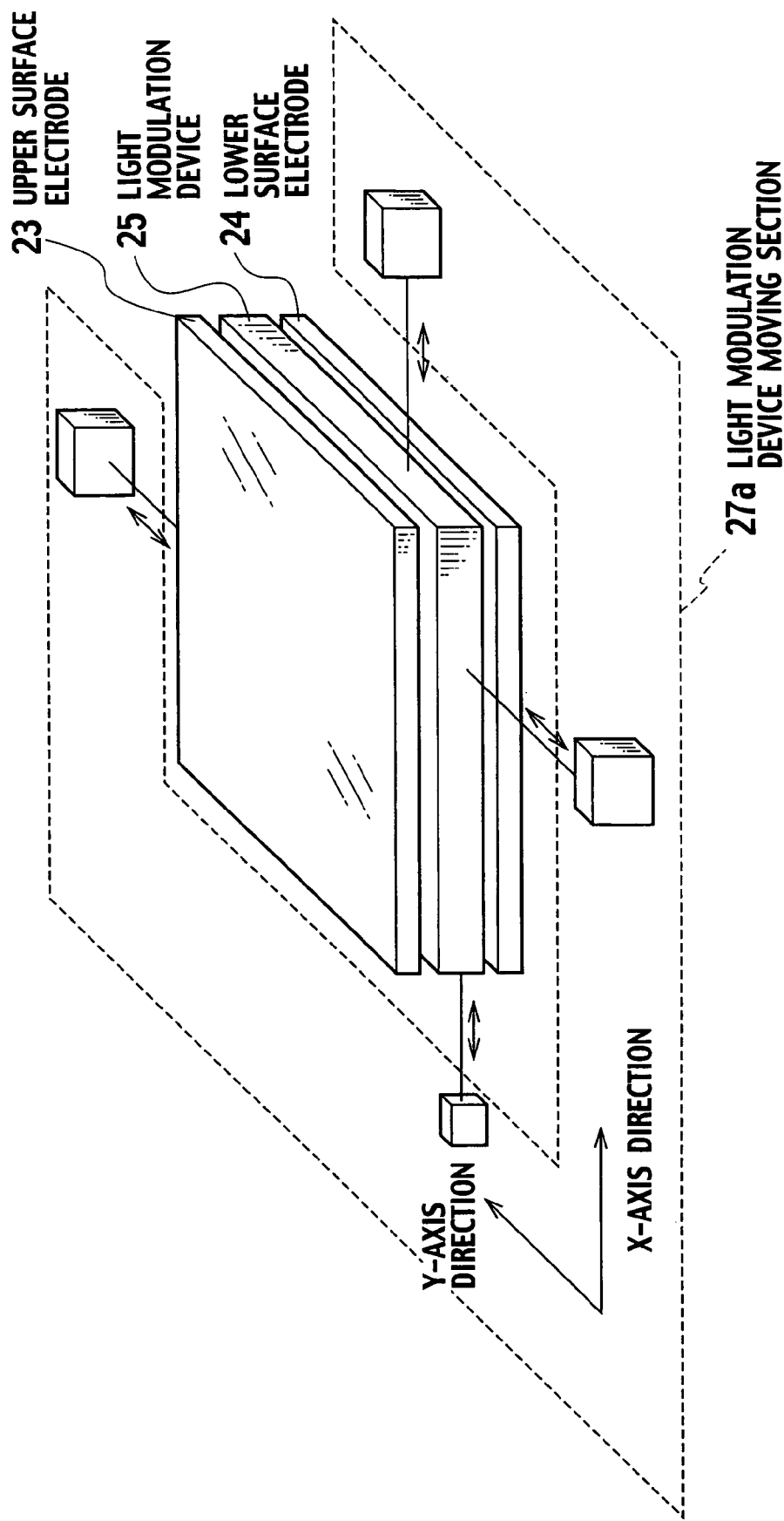
FIG. 19 is a diagram for explaining a three-dimensional image display apparatus in the three-dimensional image display system according to the third embodiment of the present invention.

Specifically, as shown in FIG. 19, the light modulation device 25 is configured to be able to be freely moved in an X-axis direction and a Y-axis direction by the light modulation device moving section 27a which is configured by a piezoelectric element, a damper, or the like.

In this embodiment, the electric field control section 22 is configured to synthesize pre-movement electric field displacement surfaces (pre-change electric field displacement surfaces) formed by voltages applied to the plural control points 26 before the light modulation device 25 has not been moved, and post-movement electric field displacement surfaces (post-change electric field displacement surfaces) formed by voltages applied to the plural control points 26 after the light modulation device 25 has been moved, and thereby to form, in the light modulation device 25, electric field displacement surfaces having an image pattern equivalent to the image pattern of an interference fringe.

In this embodiment, in "movement information", a direction in which the light modulation device 25 is moved is indicated by a vector expressed by (distance in the X-axis direction, distance in the Y-axis direction).

In "pre-movement voltage value", there are indicated voltage values to be applied to four control points 26a to 26d surrounding an area corresponding to the image pattern before the light modulation device 25 is moved.

The voltage values are expressed as follows: (a voltage value to be applied to the control point 26a, a voltage value to be applied to the control point 26b, a voltage value to be applied to the control point 26c, a voltage value to be applied to the control point 26d).

Similarly, in "post-movement voltage value", there are indicated voltage values to be applied to the four control points 26a to 26d surrounding the area corresponding to the image pattern after the light modulation device 25 is moved.

The voltage values are expressed as follows: (a voltage value to be applied to the control point 26a, a voltage value to be applied to the control point 26b, a voltage value to be applied to the control point 26c, a voltage value to be applied to the control point 26d).

A movement control section 22e is configured to instruct the light modulation device moving section 27a to move the light modulation device 25, based on movement information of the light modulation device 25 determined by the determination section 22c.

(A Three-Dimensional Image Display System According to a Fourth Embodiment of the Present Invention)

A three-dimensional image display system according to a fourth embodiment of the present invention will be described with reference to FIGS. 20(a) and 20(b).

In the three-dimensional image display system according to this embodiment, plural control points 26 are projection portions formed on electrodes which are provided for a light modulation device 25. The other configurations are the same as those in the three-dimensional image display systems of the above-described first to third embodiments.

Figure 20:
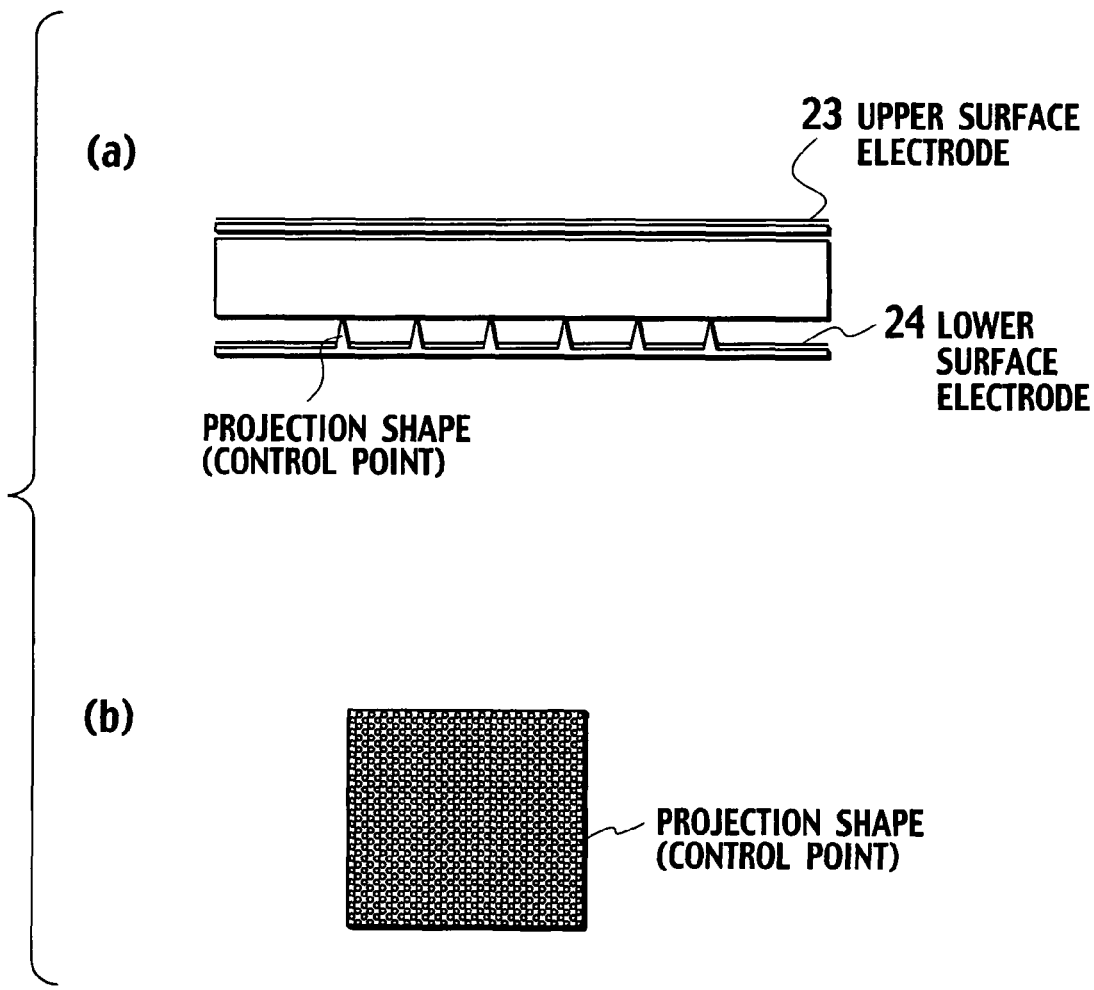
FIGS. 20(a) and 20(b) are diagrams for explaining a hologram recording device in a three-dimensional image display system according to a fourth embodiment of the present invention.

FIG. 20(a) is a diagram viewed from a side of a cross-section of a hologram recording device 21 according to this embodiment, and FIG. 20(b) is a diagram viewed from the top of the hologram recording device 21 according to this embodiment.

As shown in FIG. 20(a), in the hologram recording device 21 according to this embodiment, lower surface electrodes 24 have projection shapes. In this case, the projection portions of the lower surface electrodes 24 correspond to the control points 26 where voltage values to be applied are controlled by an electric field control section 22.

Since many electric charges are accumulated at the tips of the projection portions of the lower surface electrodes 24, large potential differences can be caused between the upper surface electrodes 23 and the lower surface electrodes 24.

With the use of the lower surface electrodes 24 according to this embodiment, the intervals between the control points 26 can be narrowed to allow the hologram recording device 21 to be downsized.

As shown in FIG. 20(b), in the hologram recording device 21 according to this embodiment, the projection portions of the lower surface electrodes 24 are configured to be uniformly distributed on a surface of the light modulation device 25.

Further, in the hologram recording device 21 according to this embodiment, each of the projection portions of the lower surface electrodes 24 is configured by a transistor which can actively control an applied voltage.

Therefore, the electric field control section 22 according to this embodiment changes as needed the projection portions of the lower surface electrodes 24, to which predetermined voltages are applied; synthesizes plural electric field displacement surfaces, without moving the upper surface electrodes 23 or the lower surface electrodes 24 as in the three-dimensional image display system according to the above-described second embodiment; and forms, in the light modulation device 25, an image pattern equivalent to the image pattern of the interference fringe with high precision.

(A Three-Dimensional Image Display System According to a Fifth Embodiment of the Present Invention)

A three-dimensional image display system according to a fifth embodiment of the present invention will be described with reference to FIGS. 21 and 22. As for the three-dimensional image display system according to this embodiment, differences from those according to the above-described first through fourth embodiments are mainly described hereinafter.

Figure 21:
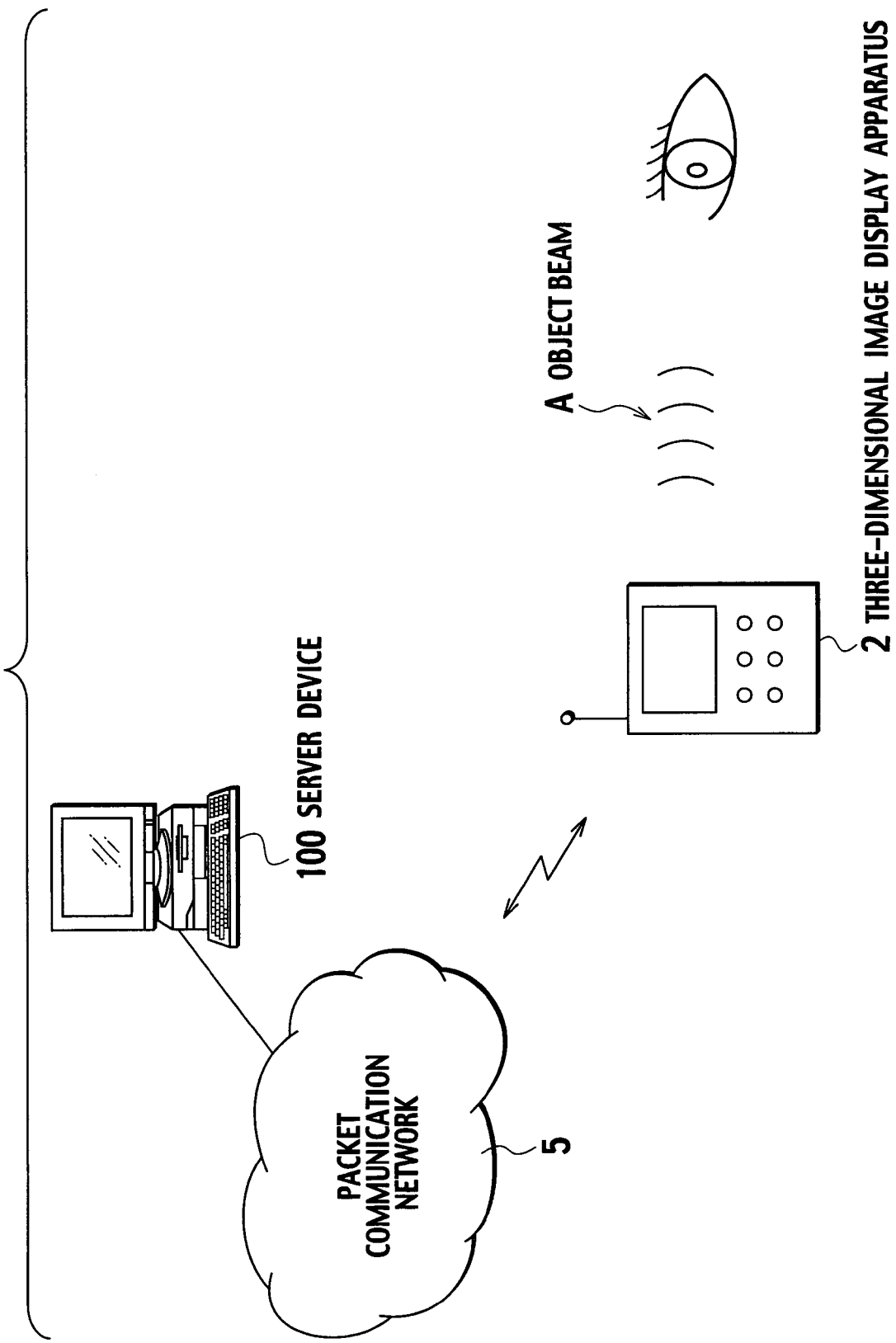
FIG. 21 is a diagram showing the entire configuration of three-dimensional image display systems according to fifth and sixth embodiments of the present invention.

As shown in FIG. 21, the three-dimensional image display system according to this embodiment includes a server device 100 and a three-dimensional image display apparatus 2.

In this embodiment, an example will be described in which the three-dimensional image display apparatus 2 is configured by a portable communication terminal capable of communicating with the server device 100 via a packet communication network 5.

Figure 22:
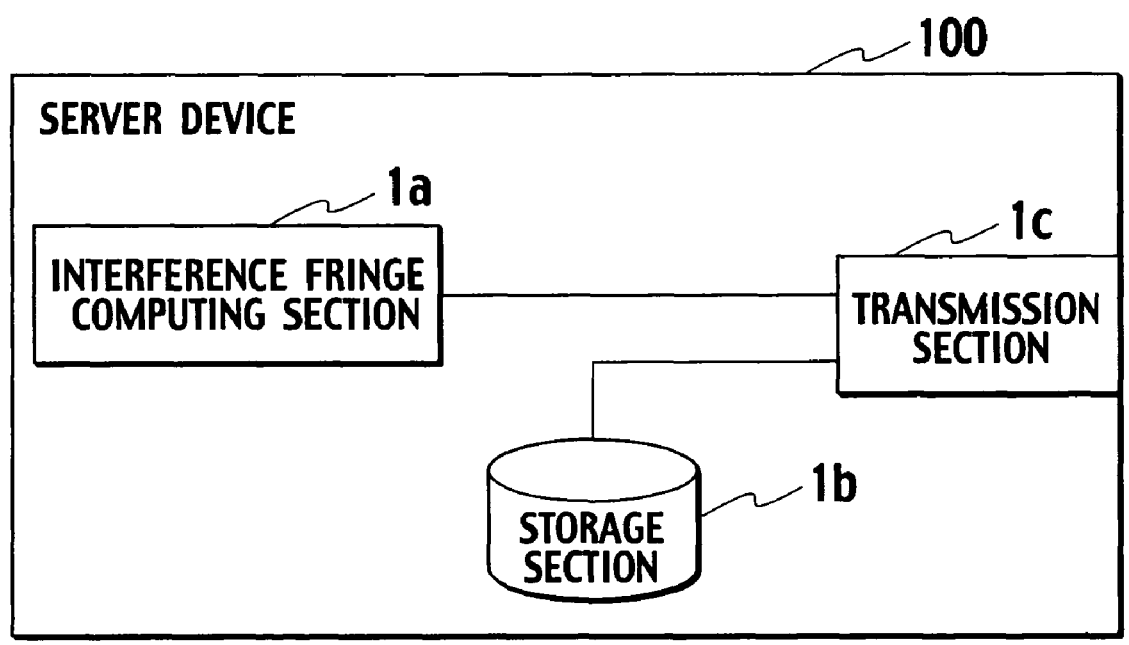
FIG. 22 is functional block diagram of a server device in the three-dimensional image display systems according to the fifth and sixth embodiments of the present invention.

The server device 100 includes an interference fringe computing section 1a, a storage section 1b, and a transmission section 1c, as shown in FIG. 22.

The interference fringe computing section 1a is configured to calculate an interference fringe (computer generated hologram) generated by an object beam and a reference beam.

The storage section 1b is configured to store the image pattern of the an interference fringe in association with a voltage value to be applied to each of plural upper surface electrodes 23 and lower surface electrodes 24, in other words, each of control points 26. For example, the storage section 1b is configured to store a table shown in FIG. 9.

The transmission section 1c is configured to transmit plural voltage values (voltage values to be applied to the control points 26) associated with the image pattern of the calculated interference fringe to the three-dimensional image display apparatus 2.

Figure 23:
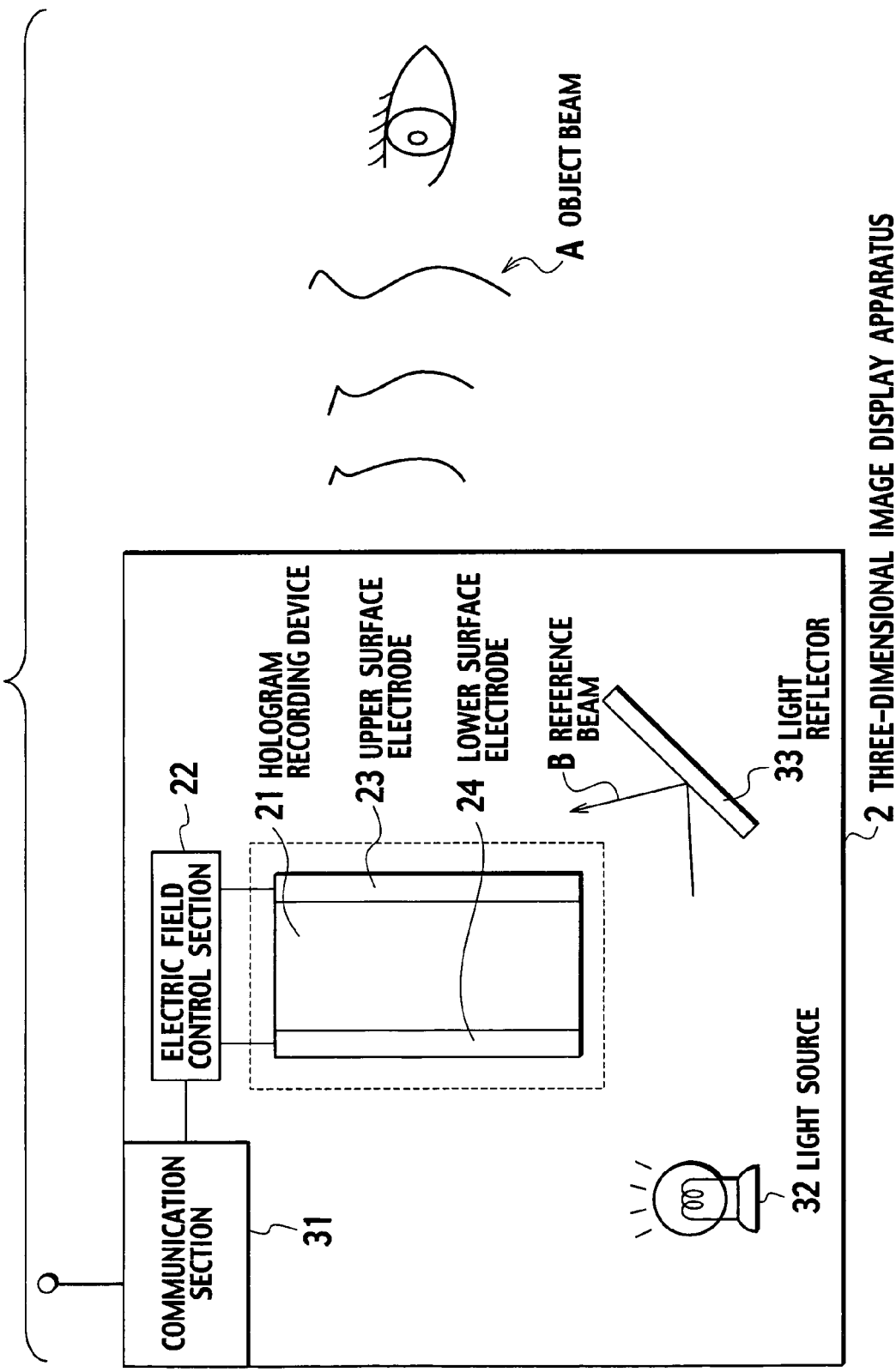
FIG. 23 is a diagram for explaining a three-dimensional image display apparatus in the three-dimensional image display system according to the fifth embodiment of the present invention.

The three-dimensional image display apparatus 2 includes a communication section 31, a hologram recording device 21, an electric field control section 22, a light source 32, and a light reflector 33, as shown in FIG. 23.

The communication section 31 is configured to request the server device 100 to transmit voltage values to be applied to the control points 26 corresponding to the image pattern of the interference fringe, and to transmit a plural of the received voltage values to the electric field control section 22.

The electric field control section 22 is configured to apply the voltages of the voltage values corresponding to the image pattern of the interference fringe, transmitted from the server device 100 via the communication section 31, to the control points 26, to form electric field displacement surfaces in a light modulation device 25 of the hologram recording device 21, and to record the interference fringe composed of the plural electric field displacement surfaces.

Note that the configuration of the hologram recording device 21 is the same as those of the hologram recording devices 21 described in the above-described first to fourth embodiments. Here, the upper surface electrodes 23 are configured by transparent electrodes.

The light reflector 33 is configured to reflect light from the light source 32 to generate a reference beam B.

Here, the reference beam B has the same wavelength and incident angle as a reference beam has, the reference beam used by the interference fringe computing section 1a of the server device 100 to calculate the interference fringe.

The light source 32 may be a backlight used for a liquid crystal display of the portable communication terminal, or a light source provided separately from the backlight.

Figure 24:
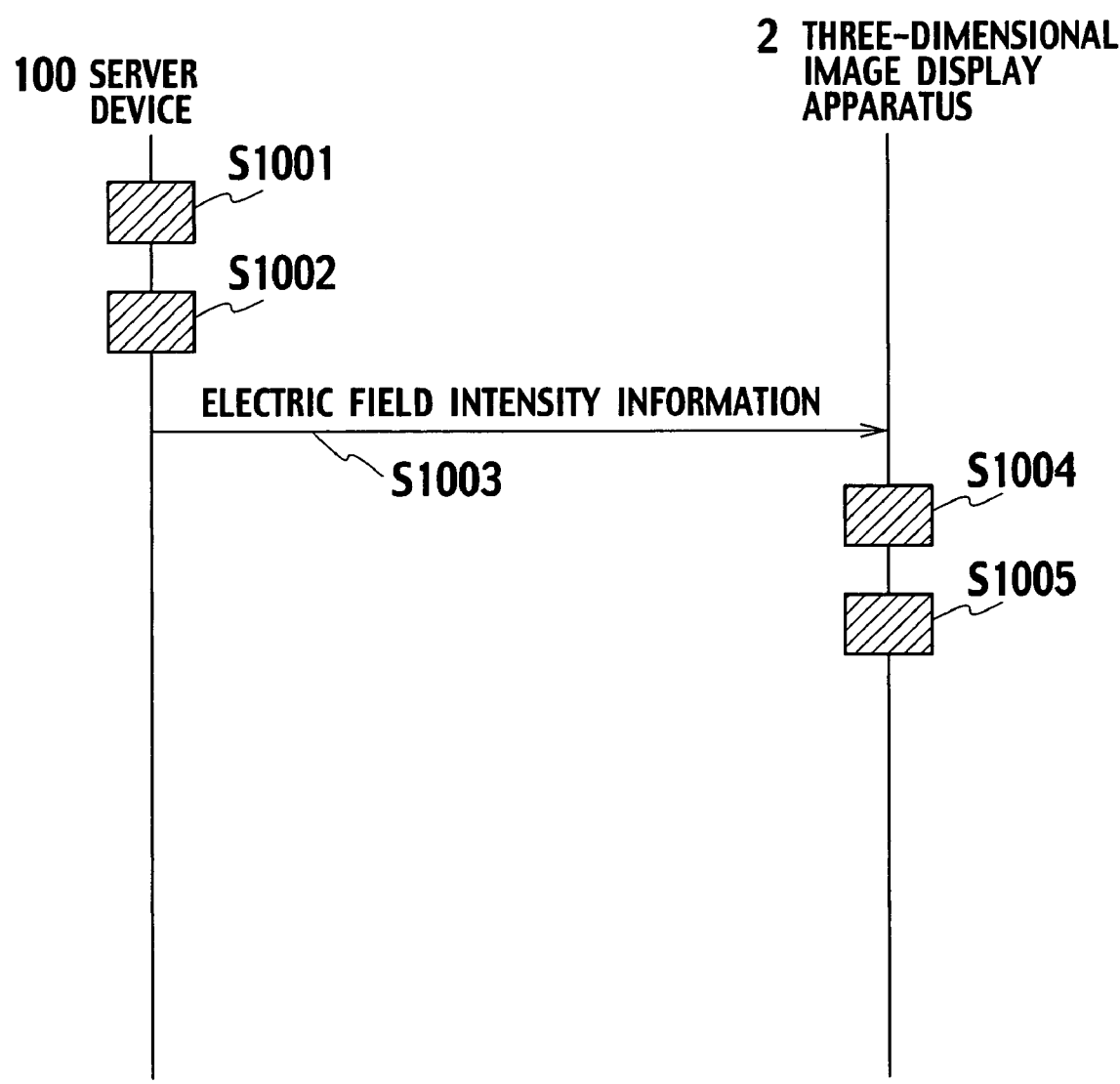
FIG. 24 is a sequence diagram showing an operation of the three-dimensional image display system according to the fifth embodiment of the present invention.

Next, an example of an operation of the three-dimensional image display system according to this embodiment will be described with reference to FIG. 24.

In step S1001, the interference fringe computing section 1a of the server device 100 calculates an interference fringe (computer generated hologram) generated by an object beam and a reference beam.

In step S1002, the transmission section 1c of the server device 100 refers to the storage section 1b, and extracts a voltage value to be applied to each of the control points 26 associated with each image pattern of the computer generated hologram.

In step S1003, the transmission section 1c of the server device 100 transmits image information including the extracted voltage value (electric field intensity information) to be applied to each of the control points 26 to the three-dimensional image display apparatus 2 via the packet communication network 5.

In step S1004, the electric field control section 22 of the three-dimensional image display apparatus 2 applies predetermined voltages to the upper surface electrodes 23 and the lower surface electrodes 24 at predetermined timing, based on the image information received from the server device 100 via the communication section 31, thereby forms electric field displacement surfaces in the light modulation device 25 of the hologram recording device 21, and records the interference fringe composed of the plural electric field displacement surfaces.

In step S1005, the light source 32 irradiates the interference fringe formed in the light modulation device 25 of the hologram recording device 21 with the reference beam B via the light reflector 33, and thereby displays a three-dimensional image.

(A Three-Dimensional Image Display System According to a Sixth Embodiment of the Present Invention)

A three-dimensional image display system according to a sixth embodiment of the present invention will be described with reference to FIGS. 22 and 25 to 27. As for the three-dimensional image display system according to this embodiment, differences from that according to the above-described fifth embodiment are mainly described hereinafter.

A server device 100 includes an interference fringe computing section 1a, a storage section 1b, and a transmission section 1c, as shown in FIG. 22.

The interference fringe computing section 1a is configured to calculate an interference fringe (computer generated hologram) generated by an object beam and a reference beam.

The storage section 1b is configured to store the image pattern of an interference fringe, movement information (change information) on the movement of plural control points 26 (or a light modulation device 25), a pre-movement voltage value (pre-change voltage value) to be applied to each of the control points 26 before its movement, and a post-movement voltage value (post-change voltage value) to be applied to each of the control points 26 after its movement, in association with one another. For example, the storage section 1b is configured to store a table shown in FIG. 14(d).

The transmission section 1c is configured to transmit the movement information, the pre-movement voltage value, and the post-movement voltage value, which are associated with the image pattern of the calculated interference fringe, to the three-dimensional image display apparatus 2.

Figure 25:
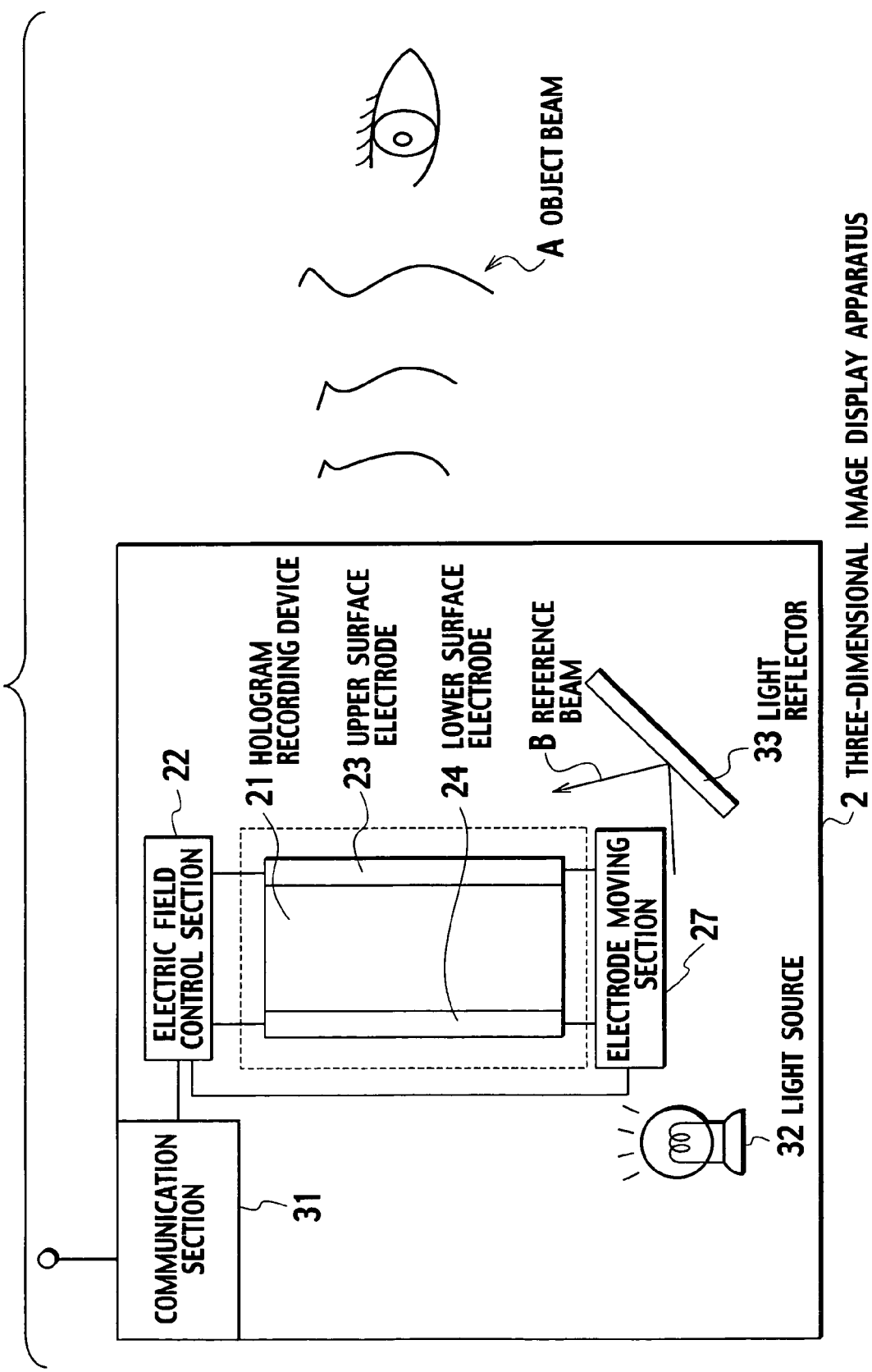
FIG. 25 is a diagram for explaining a three-dimensional image display apparatus in the three-dimensional image display system according to the sixth embodiment of the present invention.

The three-dimensional image display apparatus 2 includes a communication section 31, a hologram recording device 21, an electric field control section 22, an electrode moving section 27, a light source 32, and a light reflector 33, as shown in FIG. 25.

The communication section 31 is configured to request the server device 100 to transmit the movement information, the pre-movement voltage value, and the post-movement voltage value, which correspond to the image pattern of the interference fringe, and to transmit the received information to the electric field control section 22.

Based on the movement information of the control points 26, the pre-movement voltage value, and the post-movement voltage value, which correspond to the image pattern of the interference fringe transmitted from the server device 100 via the communication section 31, the electric field control section 22 is configured to move upper surface electrodes 23, lower surface electrodes 24, or both the electrodes 23 and 24 similarly to the electric field control section 22 according to the above-described second embodiment; to apply the pre-movement voltage value and the post-movement voltage value to each of the control points 26 at predetermined timing; thereby to form electric field displacement surfaces in the light modulation device 25 of the hologram recording device 21; and to record the interference fringe composed of the plural electric field displacement surfaces.

Note that the configuration of the hologram recording device 21 is the same as those of the hologram recording devices 21 described in the above-described first to fifth embodiments. Here, the upper surface electrodes 23 are configured by transparent electrodes.

The light reflector 33 is configured to reflect light from the light source 32 to generate a reference beam B. Here, the reference beam B has the same wavelength and incident angle as a reference beam has, the reference beam used by the interference fringe computing section 1a of the server device 100 to calculate the interference fringe.

The light source 32 may be a backlight used for a liquid crystal display of a portable communication terminal, or a light source provided separately from the backlight.

Figure 26:
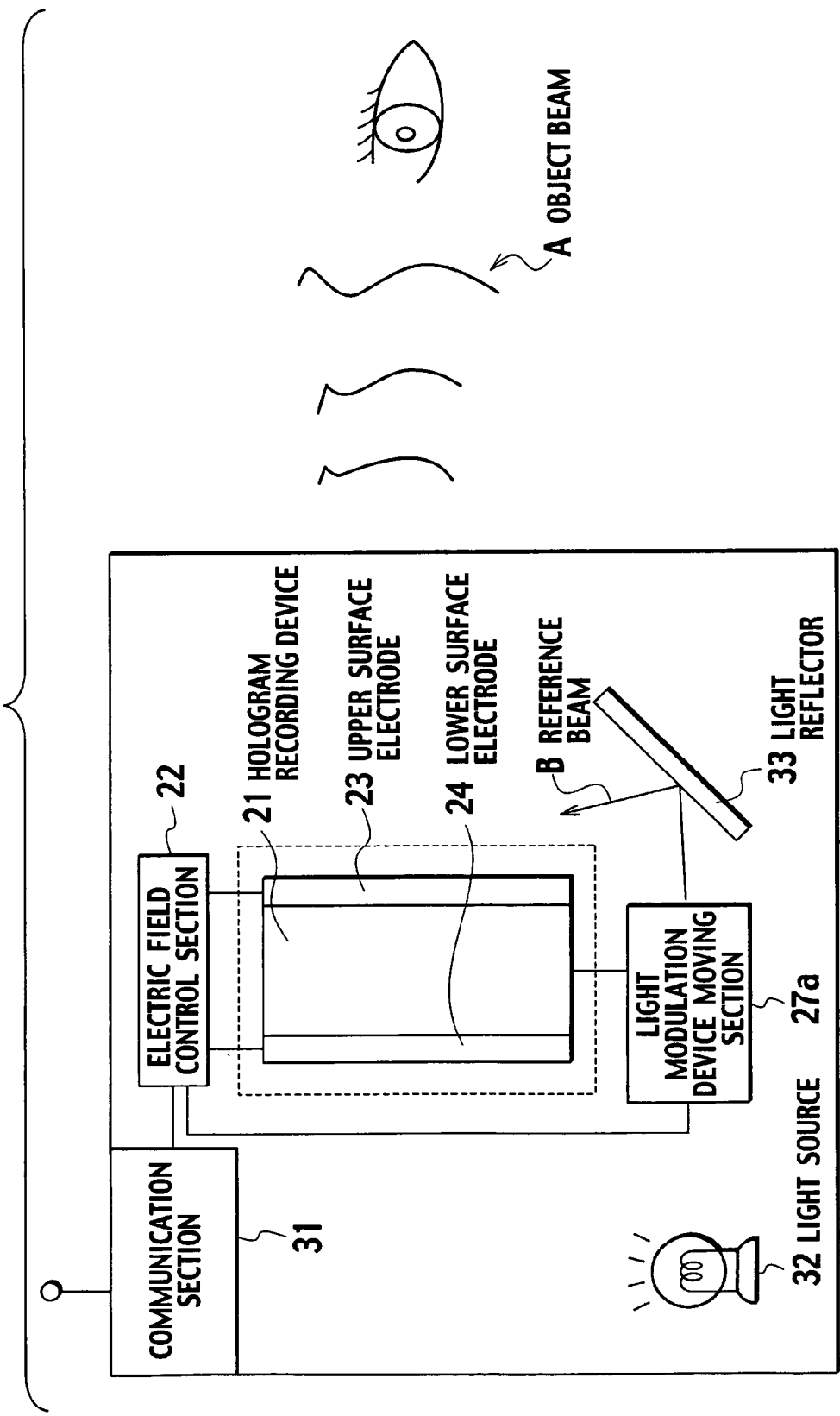
FIG. 26 is a diagram for explaining a three-dimensional image display apparatus in the three-dimensional image display system according to the sixth embodiment of the present invention.

Alternatively, the three-dimensional image display apparatus 2 may include a communication section 31, a hologram recording device 21, an electric field control section 22, a light modulation device moving section 27a, a light source 32, and a light reflector 33, as shown in FIG. 26.

In this case, based on the movement information of the light modulation device 25, the pre-movement voltage value, and the post-movement voltage value, which correspond to the image pattern of the interference fringe transmitted from the server device 100 via the communication section 31, the electric field control section 22 is configured to move the light modulation device 25 similarly to the electric field control section 22 of the three-dimensional image display apparatus 2 according to the above-described third embodiment; to apply the pre-movement voltage value and the post-movement voltage value to each of the control points 26 at predetermined timing; thereby to form electric field displacement surfaces in the light modulation device 25 of the hologram recording device 21; and to record the interference fringe composed of the plural electric field displacement surfaces.

Figure 27:
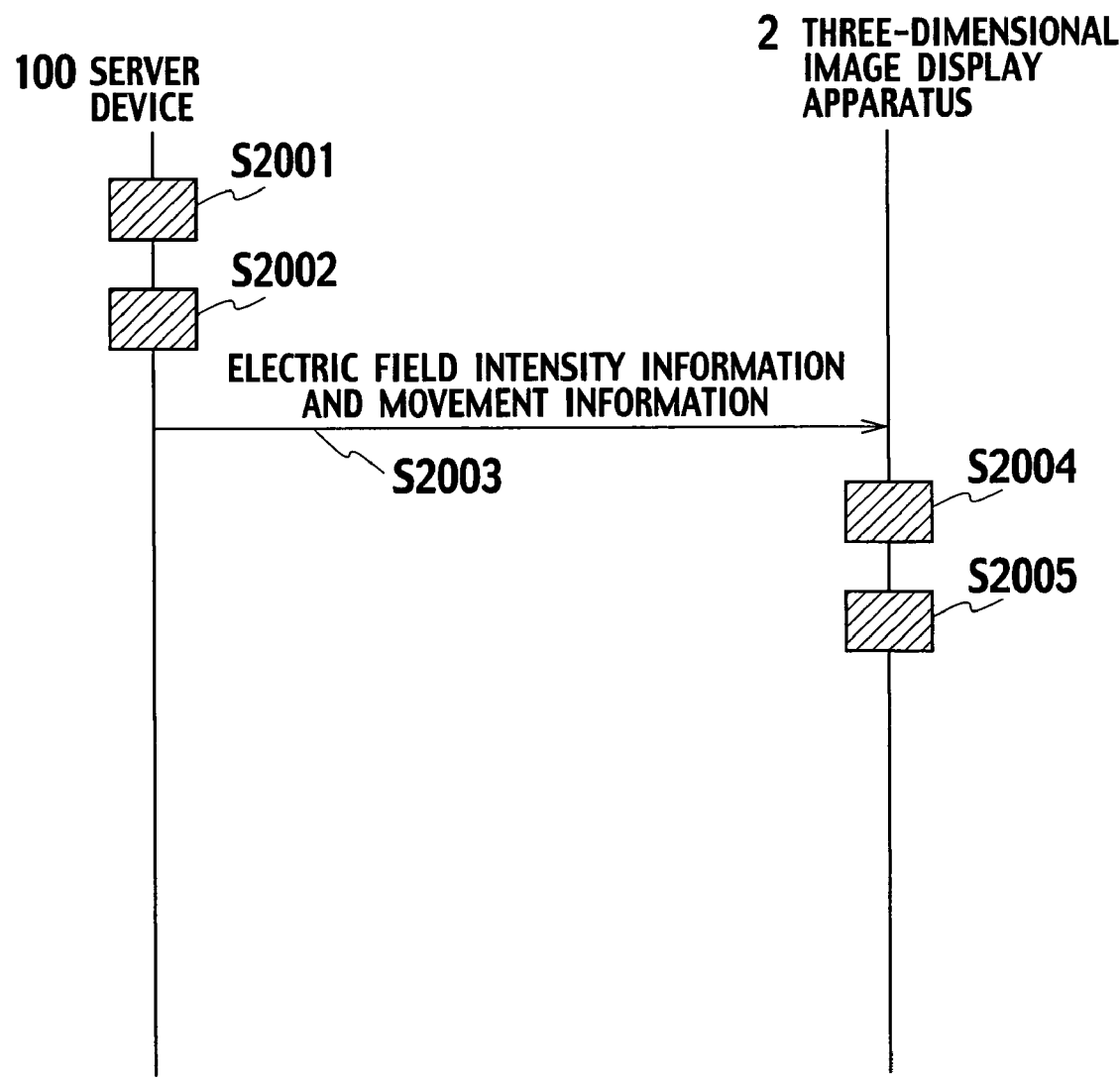
FIG. 27 is a sequence diagram showing an operation of the three-dimensional image display system according to the sixth embodiment of the present invention.

Next, an example of an operation of the three-dimensional image display system according to this embodiment will be described with reference to FIG. 27.

In step S2001, the interference fringe computing section 1a of the server device 100 calculates an interference fringe (computer generated hologram) generated by an object beam and a reference beam.

In step S2002, the transmission section 1c of the server device 100 refers to the storage section 1b, and extracts the movement information, the pre-movement voltage value, and the post-movement voltage value which are associated with each image pattern of the computer generated hologram.

In step S2003, the transmission section 1c of the server device 100 transmits image information including the extracted movement information (electrode movement information or light modulation device movement information), pre-movement voltage value, post-movement voltage value, and application duration for respective voltage values (electric field intensity information) to the three-dimensional image display apparatus 2 via the packet communication network 5.

In step S2004, based on the image information transmitted from the server device 100 via the communication section 31, the electric field control section 22 of the three-dimensional image display apparatus 2 instructs the electrode moving section 27 to move the control points 26, applies predetermined voltages (voltages of the pre-movement voltage values or of the post-movement voltage values) for predetermined application duration to the upper surface electrodes 23 and the lower surface electrodes 24 at predetermined timing, thereby forms electric field displacement surfaces in the light modulation device 25 of the hologram recording device 21, and records the interference fringe composed of the plural electric field displacement surfaces.

Alternatively, in step S2004, based on the image information transmitted from the server device 100 via the communication section 31, the electric field control section 22 of the three-dimensional image display apparatus 2 instructs the light modulation device moving section 27a to move the light modulation device 25, applies predetermined voltages (voltages of the pre-movement voltage values or of the post-movement voltage values) for predetermined application duration to the upper surface electrodes 23 and the lower surface electrodes 24 at predetermined timing, thereby forms electric field displacement surfaces in the light modulation device 25 of the hologram recording device 21, and records the interference fringe composed of the plural electric field displacement surfaces.

In step S2005, the light source 32 irradiates the interference fringe formed in the light modulation device 25 of the hologram recording device 21 with the reference beam B via the light reflector 33 and thereby displays a three-dimensional image.

(A Three-Dimensional Image Display System According to a Seventh Embodiment of the Present Invention)

A three-dimensional image display system according to a seventh embodiment of the present invention will be described with reference to FIGS. 28(a), 28(b), 29(a), and 29(b). As for the three-dimensional image display system according to this embodiment, differences from those according to the above-described first to sixth embodiments are mainly described hereinafter.

Figure 28:
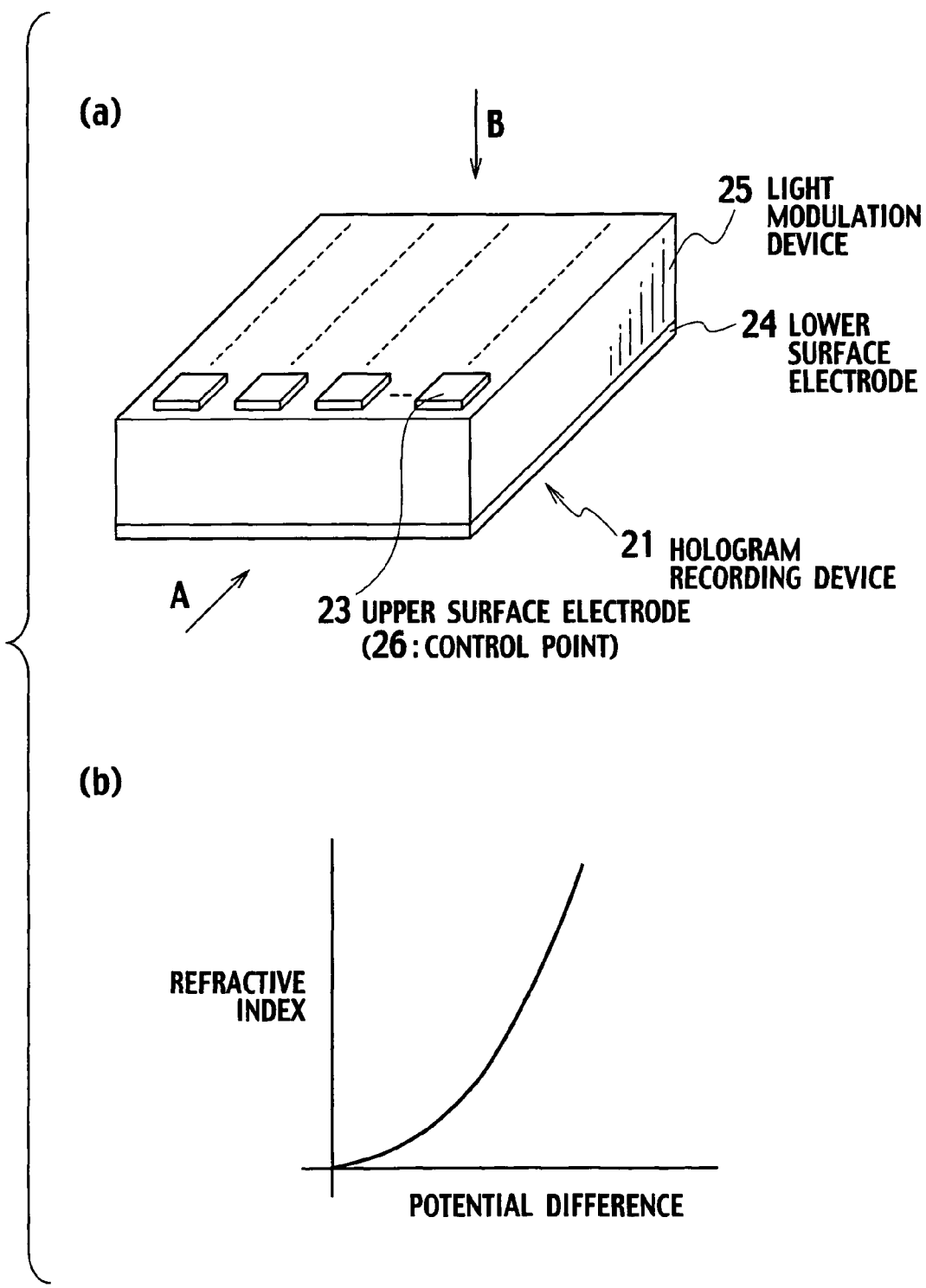
FIGS. 28(a) and 28(b) are diagrams for explaining a three-dimensional image display apparatus in a three-dimensional image display system according to a seventh embodiment of the present invention.

As shown in FIG. 28(a), a hologram recording device 21 according to this embodiment includes a light modulation device 25 having the electro-optic effect in which the refractive index changes according to the electric field intensity, and a plurality of control points 26 provided on a surface of the light modulation device 25.

Specifically, in the hologram recording device 21, a plurality of upper surface electrodes 23 are provided on the top surface of the light modulation device 25, and a lower surface electrode 24 is provided on the bottom surface of the light modulation device 25. Here, the lower surface electrode 24 is grounded.

In this embodiment, each of the upper surface electrodes 23 provided on the top surface of the light modulation device 25 is referred to as a "control point 26" where a voltage value to be applied is controlled by an electric field control section 22.

A voltage value to be applied to each of the upper surface electrodes 23 is independently controlled by the electric field control section 22.

Note that each of the upper surface electrodes 23 in this embodiment does not correspond to each pixel constituting an image to be displayed, unlike the electrodes 23 provided in the conventional image display apparatus having an active-matrix electrode structure, which has been described in the related art section.

In this embodiment, as shown in FIG. 28(b), the relationship between applied electric field intensity (potential difference) and a change in refractive index is nonlinear in the light modulation device 25. In other words, the light modulation device 25 according to this embodiment has such a characteristic that as the applied electric field intensity increases, the refractive index rapidly changes.

Figure 29:
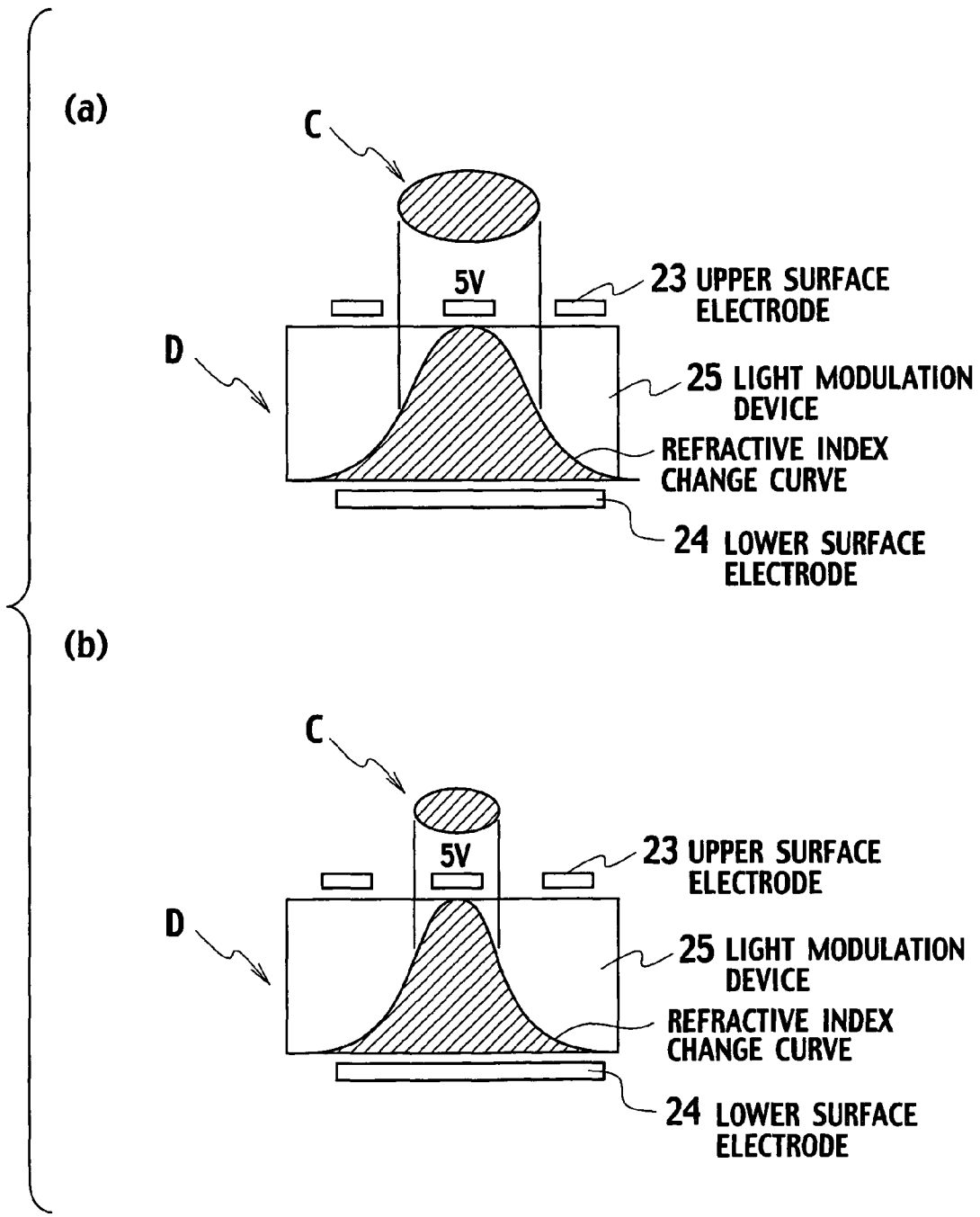
FIGS. 29(a) and 29(b) are diagrams for explaining the three-dimensional image display apparatus in the three-dimensional image display system according to the seventh embodiment of the present invention.

FIG. 29(a) shows an example of a case of using a light modulation device in which the relationship between applied electric field intensity (potential difference) and a change in refractive index is linear, and FIG. 29(b) shows an example of a case of using the light modulation device 25 according to this embodiment, in which the relationship between the applied electric field intensity (potential difference) and the change in refractive index is nonlinear.

In FIGS. 29(a) and 29(b), reference symbol "C" denotes a state (a change pattern of the refractive index) of the hologram recording device 21 viewed from a direction "B" shown in FIG. 28(a), and reference symbol "D" denotes a cross section of the hologram recording device 21 viewed from a direction "A" shown in FIG. 28(a).

As apparent from FIGS. 29(a) and 29(b), even when the same potential difference (for example, "5 V") is applied between the upper surface electrodes 23 and the lower surface electrode 24, a change in the refractive index is different (see a refractive index change curve shown in "D") and the change pattern of the refractive index viewed from the direction "B" shown in FIG. 28(a) is also different in the light modulation device 25, between the hologram recording device 21 shown in FIG. 29(a) and the hologram recording device 21 shown in FIG. 29(b).

Specifically, the change pattern of the refractive index in the hologram recording device 21 shown in FIG. 29(b) is smaller than that in the hologram recording device 21 shown in FIG. 29(a).

According to this embodiment, when a predetermined potential difference is applied between the upper surface electrodes 23 and the lower surface electrode 24, a smaller change pattern of the refractive index can be generated as compared with the change pattern of the refractive index in the hologram recording device 21 using the light modulation device in which the relationship between the applied electric field intensity (potential difference) and the change in refractive index is linear, thereby the image pattern of a finer interference fringe can be generated.

(A Three-Dimensional Image Display System According to an Eighth Embodiment of the Present Invention)

A three-dimensional image display system according to an eighth embodiment of the present invention will be described with reference to FIGS. 30(a) and 30(b) and 31 to 32. As for the three-dimensional image display system according to this embodiment, differences from those according to the above-described first to seventh embodiments are mainly described hereinafter.

The configuration of a hologram recording device 21 according to this embodiment is the same as that of the hologram recording device 21 described in the above-described seventh embodiment (see FIG. 28(a)).

Figure 30:
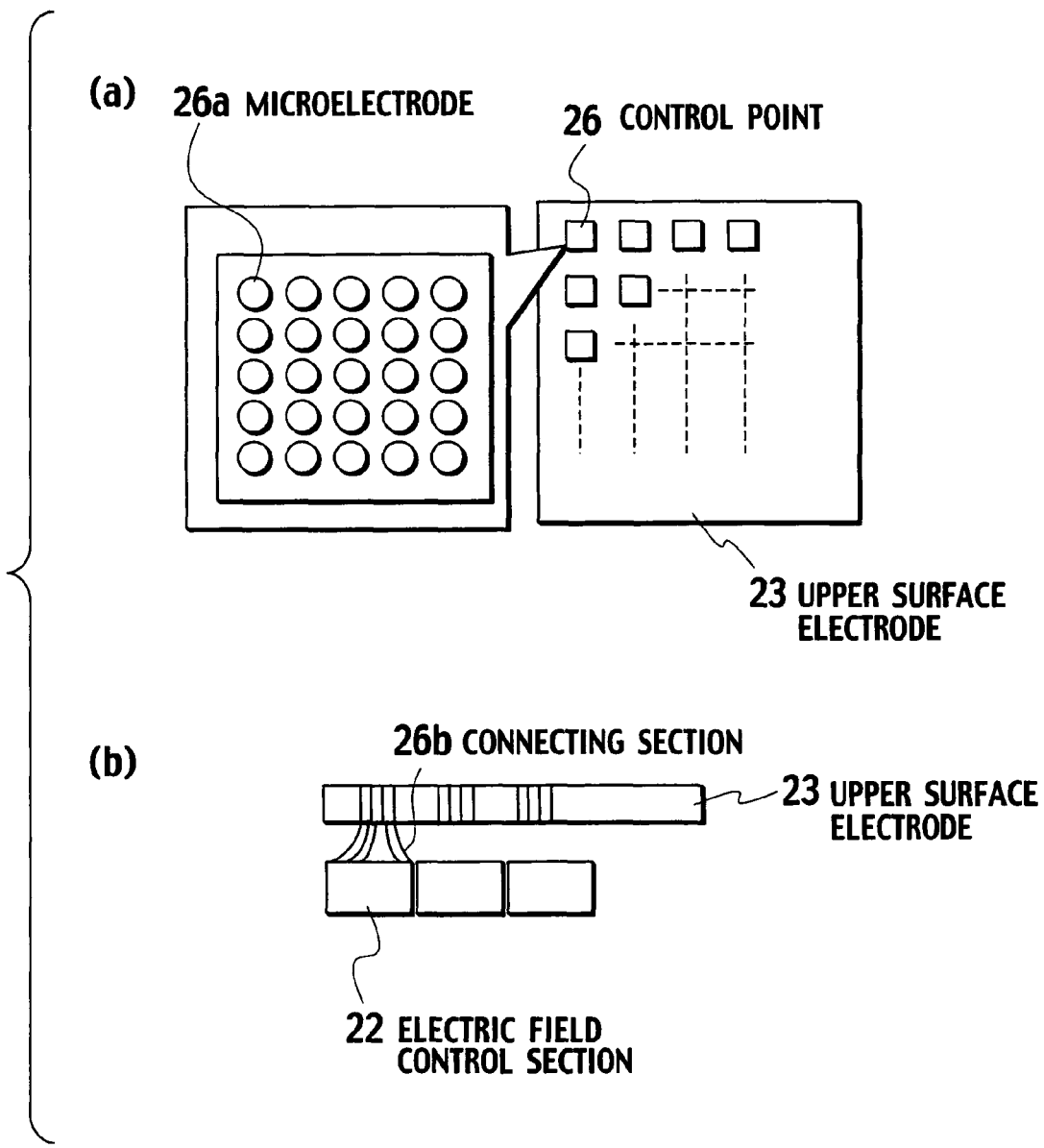
FIGS. 30(a) and 30(b) are diagrams for explaining a three-dimensional image display apparatus in a three-dimensional image display system according to an eighth embodiment of the present invention.

In this embodiment, a control point 26 is configured to have plural microelectrodes 26a, as shown in FIG. 30(a). In an example shown in FIG. 30(a), each of the microelectrodes 26a has a circular shape. However, the present invention is not limited to this, but can also be applied to a case where the control point 26 includes microelectrodes 26a having any shape.

An electric field control section 22 is configured to control a voltage value to be applied to each of the microelectrodes 26a.

Specifically, as shown in FIG. 30(b), the electric field control section 22 is connected to each of the microelectrodes 26a by a connecting section 26b such as a cable, and can independently control a voltage value to be applied to each of the microelectrodes 26a.

Figure 31:
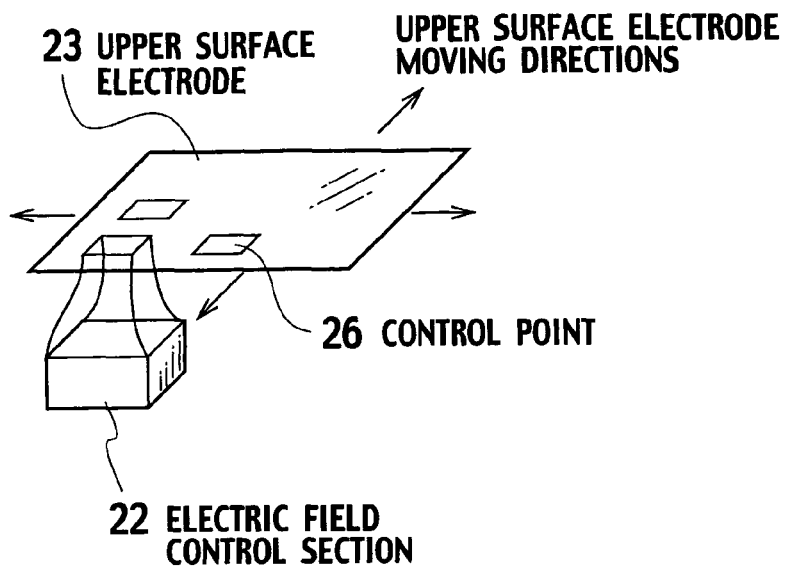
FIG. 31 is a diagram for explaining the three-dimensional image display apparatus in the three-dimensional image display system according to the eighth embodiment of the present invention.

As shown in FIG. 31, upper surface electrodes 23 provided with the control points 26 (or a lower surface electrode 24) may be configured to be able to move in predetermined directions (upper surface electrode moving directions or lower surface electrode moving directions) similar to the case in the above-described second embodiment.

Figure 32:
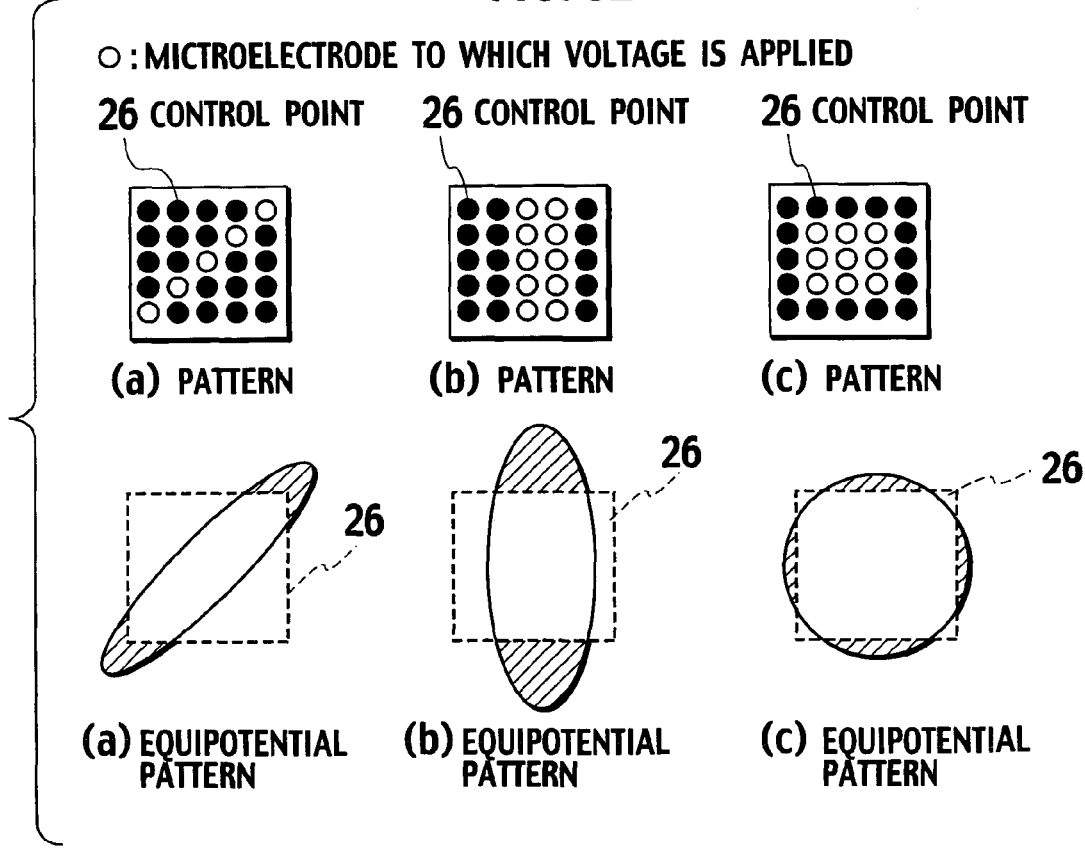
FIG. 32 is a diagram for explaining the three-dimensional image display apparatus in the three-dimensional image display system according to the eighth embodiment of the present invention.

FIG. 32 shows patterns (a) to (c) of the microelectrodes 26a which constitute the control point 26, in a case when voltages are applied to part of the microelectrodes 26a.

In FIG. 32, a voltage is applied to the microelectrode 26a indicated by a white circle, and a voltage is not applied to the microelectrode 26a indicated by a black circle.

When the microelectrodes 26a to which voltages are applied show the "pattern (a)", an equipotential surface formed in a light modulation device 25 shows "pattern (a)". When the microelectrodes 26a to which voltages are applied show the "pattern (b)", an equipotential surface formed in the light modulation device 25 shows "pattern (b)". When the microelectrodes 26a to which voltages are applied show the "pattern (c)", an equipotential surface formed in the light modulation device 25 shows "pattern (c)".

As described above, according to this embodiment, plural equipotential-surface patterns can be generated by changing the patterns of the microelectrodes 26a to which voltages are applied, therefore, the image pattern of an interference fringe can be generated with high precision.

As described above, according to the present invention, it is possible to provide an image display apparatus, a three-dimensional image display apparatus, and a three-dimensional image display system all of which can eliminate, as much as possible, a limitation (quantization error) of the image display precision determined by the size and shape of each pixel electrode, by utilizing crosstalk.

Further, according to the present invention, it is possible to provide an image display apparatus, a three-dimensional image display apparatus, and a three-dimensional image display system all of which can eliminate, as much as possible, a limitation of the image display precision determined by the size and shape of each pixel electrode.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A three-dimensional image display apparatus which displays a three-dimensional image using an interference fringe calculated by an interference fringe computing apparatus which calculates the interference fringe generated by an object beam and a reference beam, the apparatus comprising:
   a light modulation device having an electro-optic effect in which a refractive index changes according to electric field intensity;
   a plurality of control points provided on a surface of the light modulation device;
   a storage section configured to store a table in which each of a plurality of voltage values to be applied to each of the plurality of control points is associated with an image pattern of the interference fringe to which crosstalk is reflected;
   a determination section configured to select the image pattern of the interference fringe which is the most similar to a calculated interference fringe, and determine the plurality of voltage values in association with a selected image pattern of the interference fringe; and
   an electric field control section configured to apply a voltage corresponding to each of the plurality of voltage values determined by the determination section to each of the plurality of control points, and to form electric field displacement surfaces having the image pattern of the interference fringe which is the most similar to the calculated interference fringe, in the light modulation device.

2. The three-dimensional image display apparatus according to claim 1, wherein the image pattern of the interference fringe is formed by at least one of phase information of the interference fringe and amplitude information of the interference fringe.

3. The three-dimensional image display apparatus according to claim 1, wherein the control points are points on the light modulation device where vertical-direction wiring electrodes which are arranged in a vertical direction on a top surface of the light modulation device and horizontal-direction wiring electrodes which are arranged in a horizontal direction on a bottom surface of the light modulation device overlap.

4. The three-dimensional image display apparatus according to claim 1, wherein the plurality of control points are projection portions on electrodes provided on the surface of the light modulation device.

5. The three-dimensional image display apparatus according to claim 1, wherein, in the light modulation device, a relationship between the electric field intensity and the change in the refractive index is nonlinear.

6. The three-dimensional image display apparatus according to claim 1, wherein:
each of the plurality of control points respectively includes a plurality of microelectrodes; and
the electric field control section is configured to control a voltage value to be applied to each of the plurality of microelectrodes.

7. A three-dimensional image display system which displays a three-dimensional image, comprising a server device and a three-dimensional image display apparatus, wherein:
the server device comprises:
an interference fringe computing section configured to calculate an interference fringe generated by an object beam and a reference beam;
a storage section configured to store a table in which each of a plurality of voltage values to be applied to each of a plurality of control points is associated with an image pattern of the interference fringe to which crosstalk is reflected; and
a transmission section configured to select the image pattern of the interference fringe which is the most similar to a calculated interference fringe, to determine the plurality of voltage values in association with a selected image pattern of the interference fringe, and to transmit a plurality of determined voltage values to the three-dimensional image display apparatus; and
the three-dimensional image display apparatus comprises:
a light modulation device having an electro-optic effect in which a refractive index changes according to electric field intensity;
the plurality of control points provided on a surface of the light modulation device; and
an electric field control section configured to apply, to each of the plurality of control points, a voltage corresponding to each of the plurality of voltage values received from the server device, and to form electric field displacement surfaces having the image pattern of the interference fringe which is the most similar to the calculated interference fringe, in the light modulation device.

8. An image display apparatus, comprising:
a light modulation device having an electro-optic effect in which a refractive index changes according to electric field intensity;
a plurality of control points configured by top electrodes on a top surface of the light modulation device and bottom electrodes on a bottom surface of the light modulation device, a relative positional relationship between each of the plurality of control points and the light modulation device being able to be changed, complying with at least one of position movement of the top electrodes on the top surface and position movement of the bottom electrodes on the bottom surface; and
an electric field control section configured to synthesize pre-change electric field displacement surfaces formed by voltages applied to the plurality of control points in which the positional relationship has not been changed and post-change electric field displacement surfaces formed by voltages applied to the plurality of control points in which the positional relationship has been changed, and to form electric field displacement surfaces having a predetermined image pattern in the light modulation device.

9. A three-dimensional image display apparatus which displays a three-dimensional image by using a calculated interference fringe, the apparatus comprising:
a light modulation device having an electro-optic effect in which a refractive index changes according to electric field intensity;
a plurality of control points configured by top electrodes on a top surface of the light modulation device and bottom electrodes on a bottom surface of the light modulation device, a relative positional relationship between each of the plurality of control points and the light modulation device being able to be changed, complying with at least one of position movement of the top electrodes on the top surface and position movement of the bottom electrodes on the bottom surface; and
an electric field control section configured to synthesize pre-change electric field displacement surfaces formed by voltages applied to the plurality of control points in which the positional relationship has not been changed and post-change electric field displacement surfaces formed by voltages applied to the plurality of control points in which the positional relationship has been changed, and to form electric field displacement surfaces having an image pattern equivalent to an image pattern of the interference fringe, in the light modulation device.

10. The three-dimensional image display apparatus according to claim 9, wherein the electric field control section is configured to apply voltages to the plurality of control points in which the positional relationship has not been changed, and while maintaining a state where the refractive index of the light modulation device has been changed, to apply voltages to the plurality of control points in which the positional relationship has been changed.

11. The three-dimensional image display apparatus according to claim 9, wherein the image pattern of the interference fringe is formed by at least one of phase information of the interference fringe and amplitude information of the interference fringe.

12. The three-dimensional image display apparatus according to claim 9, wherein the plurality of control points are points on the light modulation device where vertical-direction wiring electrodes which are arranged in a vertical direction on a top surface of the light modulation device and horizontal-direction wiring electrodes which are arranged in a horizontal direction on a bottom surface of the light modulation device overlap.

13. The three-dimensional image display apparatus according to claim 9, wherein the electric field control section is configured to store an image pattern of the interference fringe in association with a voltage value to be applied to each of the plurality of control points, and to apply the voltage value associated with the image pattern of the calculated interference fringe to each of the plurality of control points.

14. The three-dimensional image display apparatus according to claim 9, wherein the plurality of control points are electrodes provided to be freely moved on the surface of the light modulation device.

15. The three-dimensional image display apparatus according to claim 9, wherein the light modulation device is configured to be able to be freely moved with respect to the plurality of control points.

16. The three-dimensional image display apparatus according to claim 9, wherein the plurality of control points are projection portions on electrodes provided on the surface of the light modulation device.

17. The three-dimensional image display apparatus according to claim 9, wherein, in the light modulation device, a relationship between the electric field intensity and the change in the refractive index is nonlinear.

18. The three-dimensional image display apparatus according to claim 9, wherein:
   each of the plurality of control points respectively includes a plurality of microelectrodes; and
   the electric field control section is configured to control a voltage value to be applied to each of the plurality of microelectrodes.

19. The three-dimensional image display apparatus according to claim 9, wherein the electric field control section is configured to control individually application duration for which a voltage is applied to the plurality of control points, before and after the relative positional relationship is changed.

20. The three-dimensional image display apparatus according to claim 9, wherein the electric field control section is configured to control individually, for each of the plurality of control points, application duration for which a voltage is applied to each of the plurality of control points.

21. A three-dimensional image display system which displays a three-dimensional image, comprising a server device and a three-dimensional image display apparatus, wherein:
   the server device comprises:
      an interference fringe computing section configured to calculate an interference fringe generated by an object beam and a reference beam;
      a storage section configured to store an image pattern of an interference fringe, change information on a change in a relative positional relationship between each of a plurality of control points and a light modulation device of the three-dimensional image display apparatus, a pre-change voltage value to be applied to each of the plurality of control points in which the relative positional relationship has not been changed, and a post-change voltage value to be applied to each of the plurality of control points in which the relative positional relationship has been changed, in association with one another; and
      a transmission section configured to transmit the change information, the pre-change voltage value, and the post-change voltage value which are associated with the image pattern of the calculated interference fringe, to the three-dimensional image display apparatus; and
   the three-dimensional image display apparatus comprises:
      a light modulation device having an electro-optic effect in which a refractive index changes according to electric field intensity;
      the plurality of control points configured by top electrodes on a top surface of the light modulation device and bottom electrodes on a bottom surface of the light modulation device, a relative positional relationship between each of the plurality of control points and the light modulation device being able to be changed, complying with at least one of position movement of the top electrodes on the top surface and position movement of the bottom electrodes on the bottom surface;
      a moving section configured to change the relative positional relationship between each of the plurality of control points and the light modulation device based on the change information; and
      an electric field control section configured to apply, to each of the plurality of control points, a voltage corresponding to each of the plurality of the pre-change voltage values received from the server device before the moving section changes the relative positional relationship, to apply, to each of the plurality of control points, a voltage corresponding to each of the plurality of the post-change voltage values received from the server device after the moving section changes the relative positional relationship, and to form electric field displacement surfaces having an image pattern equivalent to the image pattern of the interference fringe, in the light modulation device.

* * * * *